(12) United States Patent
Kawaki

(10) Patent No.: US 10,486,339 B2
(45) Date of Patent: Nov. 26, 2019

(54) RUBBER ARTICLE MOLD AND METHOD FOR MANUFACTURING RUBBER ARTICLE MOLD

(71) Applicant: BRIDGESTONE CORPORATION, Tokyo (JP)

(72) Inventor: Ryota Kawaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 52 days.

(21) Appl. No.: 15/735,343

(22) PCT Filed: Jun. 7, 2016

(86) PCT No.: PCT/JP2016/066947
§ 371 (c)(1),
(2) Date: Dec. 11, 2017

(87) PCT Pub. No.: WO2016/199771
PCT Pub. Date: Dec. 15, 2016

(65) Prior Publication Data
US 2018/0169902 A1 Jun. 21, 2018

(30) Foreign Application Priority Data
Jun. 9, 2015 (JP) ................................. 2015-116804

(51) Int. Cl.
*B29D 30/06* (2006.01)
*B29C 33/10* (2006.01)
(Continued)

(52) U.S. Cl.
CPC .............. *B29C 33/10* (2013.01); *B22F 5/007* (2013.01); *B29C 33/02* (2013.01); *B29C 33/38* (2013.01);
(Continued)

(58) Field of Classification Search
CPC ........ B29D 30/0606; B29D 2030/0617; B29C 33/10; B29C 33/3824; B29C 33/3842; B29C 2033/385
See application file for complete search history.

(56) References Cited

U.S. PATENT DOCUMENTS 4,026,512 A * 5/1977 Holt .................. B22C 9/067
138/40
4,492,554 A * 1/1985 Carter ................. B29C 33/10
425/28.1
(Continued)

FOREIGN PATENT DOCUMENTS

FR 2 996 799 A1 4/2014
JP S56-127439 A 10/1981
(Continued)

OTHER PUBLICATIONS

Aug. 16, 2016 Search Report issued in International Patent Application No. PCT/JP2016/066947.
(Continued)

*Primary Examiner* — James P Mackey
(74) *Attorney, Agent, or Firm* — Oliff PLC

(57) ABSTRACT

A rubber article mold capable of discharging air from a molding-surface side to a back-surface side during curing while suppressing the entry of rubber into an air vent hole and a method for producing such a rubber article mold are provided. The rubber article mold includes air discharge means for discharging air from a molding-surface side for molding a rubber article to a back-surface side. The air discharge means is formed as an annular hollow penetrating from a molding surface to a back surface of the rubber article mold. The annular hollow has an inflow area where the air on the molding-surface side flows in, a discharge area for discharging the air having flowed in from the inflow area to the back-surface side, and an intermediate area communi-
(Continued)

cating with the inflow area and the discharge area and smaller or larger in diameter than the inflow area and the discharge area.

8 Claims, 9 Drawing Sheets

(51) Int. Cl.
    *B29C 33/02*     (2006.01)
    *B29C 33/38*     (2006.01)
    *B29C 35/02*     (2006.01)
    *B33Y 10/00*     (2015.01)
    *B22F 5/00*     (2006.01)
    *B33Y 80/00*     (2015.01)
    *B29L 30/00*     (2006.01)

(52) U.S. Cl.
    CPC .......... *B29C 33/3842* (2013.01); *B29C 35/02* (2013.01); *B29D 30/0606* (2013.01); *B33Y 10/00* (2014.12); *B29C 2033/385* (2013.01); *B29D 2030/0617* (2013.01); *B29L 2030/002* (2013.01); *B33Y 80/00* (2014.12)

(56) References Cited

U.S. PATENT DOCUMENTS

| | | | | |
|---|---|---|---|---|
| 4,708,609 A | * | 11/1987 | Yoda | B29C 33/10 |
| | | | | 249/102 |
| 4,795,331 A | * | 1/1989 | Cain | B29C 33/10 |
| | | | | 425/28.1 |
| 5,939,101 A | * | 8/1999 | Green | B29C 33/10 |
| | | | | 249/141 |
| 6,923,629 B2 | * | 8/2005 | Ahn | B29C 33/10 |
| | | | | 425/28.1 |
| 7,645,131 B2 | * | 1/2010 | Hajd ch | B29C 33/10 |
| | | | | 249/141 |
| 8,287,260 B2 | * | 10/2012 | Penkkimaki | B29C 33/10 |
| | | | | 425/28.1 |
| 8,342,830 B2 | * | 1/2013 | Sugata | B29C 33/10 |
| | | | | 425/28.1 |
| 8,506,274 B2 | * | 8/2013 | Cazzanti | B29C 33/10 |
| | | | | 425/28.1 |
| 2015/0258745 A1 | | 9/2015 | Gueugneau | |

FOREIGN PATENT DOCUMENTS

| | | |
|---|---|---|
| JP | S57-137134 A | 8/1982 |
| JP | H10-296735 A | 11/1998 |
| JP | 2006-150602 A | 6/2006 |
| JP | 2010-280171 A | 12/2010 |
| JP | 2011-116012 A | 6/2011 |
| JP | 2014-15001 A | 1/2014 |
| JP | 2014-46640 A | 3/2014 |
| KR | 10-0857970 B1 | 9/2008 |
| WO | 2013/108537 A1 | 7/2013 |

OTHER PUBLICATIONS

Dec. 12, 2017 International Preliminary Report on Patentability issued in International Patent Application No. PCT/JP2016/066947.
May 3, 2018 Extended Search Report issued in European Patent Application No. 16807478.9.
Feb. 2, 2019 Search Report issued in Chinese Patent Application No. 2016800335394.
Hang, Jinyi et al., "Introduction to Computer Science", Tsinghua University Press, 2nd Edition, pp. 254-255, (Jun. 2014).

* cited by examiner

LAMINATION DIRECTION

LAMINATION DIRECTION

LAMINATION DIRECTION

TIRE AXIAL DIRECTION

TIRE AXIAL DIRECTION

FIG. 10
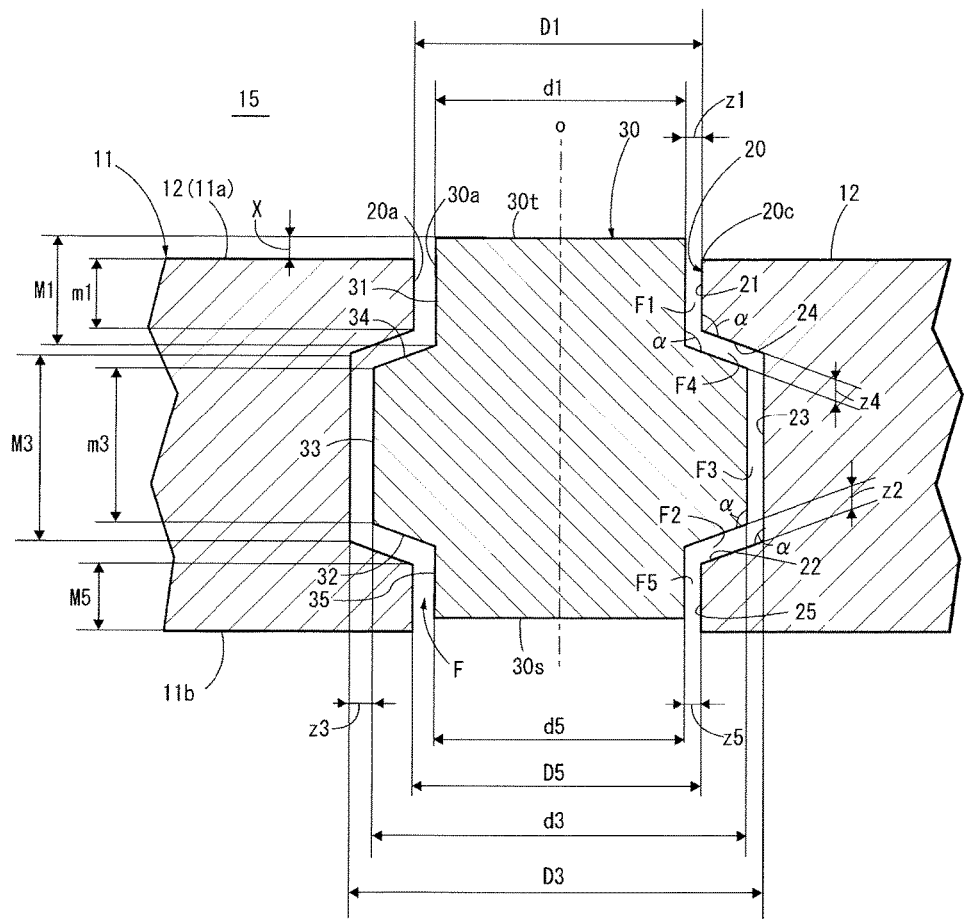
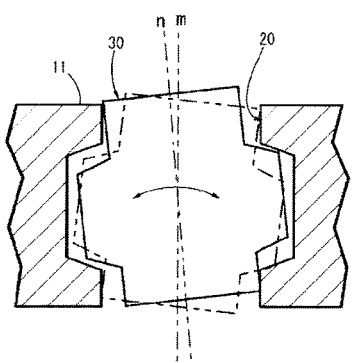
FIG. 11A
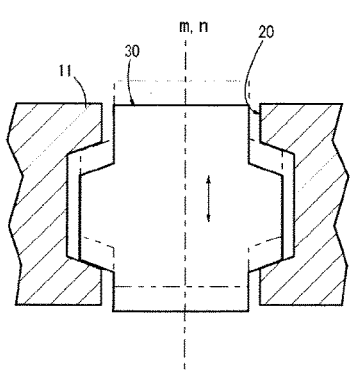
FIG. 11B
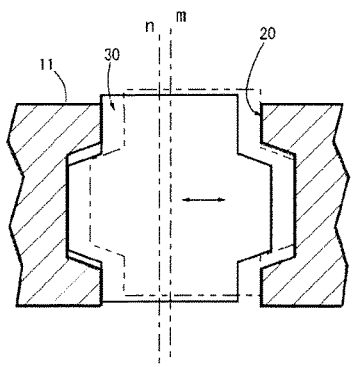
FIG. 11C

RUBBER ARTICLE MOLD AND METHOD FOR MANUFACTURING RUBBER ARTICLE MOLD

BACKGROUND OF THE INVENTION

1. Field of the Invention

The present invention relates to a rubber article mold and a method for manufacturing a rubber article mold and, more particularly, to a rubber article mold capable of controlling the entry of rubber into air vent holes that discharge air from a molding-surface side to a back-surface side during a curing process, and a method for manufacturing such a rubber article mold.

2. Description of the Related Art

Conventionally, a tire curing mold is provided with a plurality of air vent holes for discharging air from between the tire surface and the molding surface of the mold during curing (vulcanization). The air vent holes are each formed by drilling or by driving a cylindrical member called a vent piece into the hole prepared in advance when the mold is manufactured.

Also, it is known that string-like spews each 10 mm or longer are often formed on the peripheral surface of the cured tire because rubber enters the above-mentioned air vent holes during the curing process. The spews are removed after cure-molding because of their detrimental effects on the appearance and performance of the product tire. However, the removal process of spews poses an impediment to improving the production efficiency of the tire. Patent Document 1 discloses a technology for controlling the occurrence of spews by preventing the entry of rubber into air vent holes. In the technology, a valve member for sealing the opening of the hole on the molding-surface side and a spring for urging the valve member toward the surface of the tire are installed separately in the air vent holes formed on the mold beforehand. And when the tire surface comes in contact with the valve member and pushes it, the valve member closes the air vent holes.

RELATED ART DOCUMENT

Patent Document

Patent Document 1: Japanese Unexamined Patent Application Publication No. 2011-116012

SUMMARY OF THE INVENTION

Problem to be Solved by the Invention

However, a plurality of air vent holes are provided in a single mold. Thus, installing the valve member and the spring, which are separate parts, inside the holes requires a number of man-hours. And this causes a drop in production efficiency of mold manufacturing.

Accordingly, an object of the present invention is to provide a rubber article mold capable of discharging air from the molding-surface side to the back-surface side during curing while controlling the entry of rubber into air vent holes and a method for producing such a rubber article mold.

Means for Solving the Problem

A rubber article mold of a constitution to solve the above problem is a rubber article mold having air discharge means for discharging air from a molding-surface side for molding a rubber article to a back-surface side. The air discharge means is an annular hollow so formed as to penetrate from a molding surface to a back surface of the rubber article mold. And the annular hollow has an inflow area for allowing the inflow of air from the molding-surface side, a discharge area for discharging air on the back-surface side, and an intermediate area communicating with the inflow area and the discharge area and smaller or larger in diameter than the inflow area and the discharge area. Accordingly, it is possible to discharge air from the molding-surface side to the back-surface side reliably. Also, since the hollow is annular in shape, entry of rubber on the surface of a rubber article into the hollow can be prevented. As a result, the appearance of the surface of the rubber article after curing can be improved, and the man-hours for spew cutting can be saved.

It is to be understood that the foregoing summary of the invention does not necessarily recite all of the features essential to the invention, and subcombinations of all these features are intended to be included in the invention.

BRIEF DESCRIPTION OF THE DRAWINGS

FIG. 10 shows another embodiment of an air discharge means.

FIG. 11 shows the states of movement of a valve member (another embodiment).

BEST MODE FOR CARRYING OUT THE INVENTION

Hereinafter, the invention will be described based on preferred embodiments which do not intend to limit the scope of the claims of the present invention. Not all of the combinations of the features described in the embodiments are necessarily essential to the solutions presented by the invention.

Figure 1:
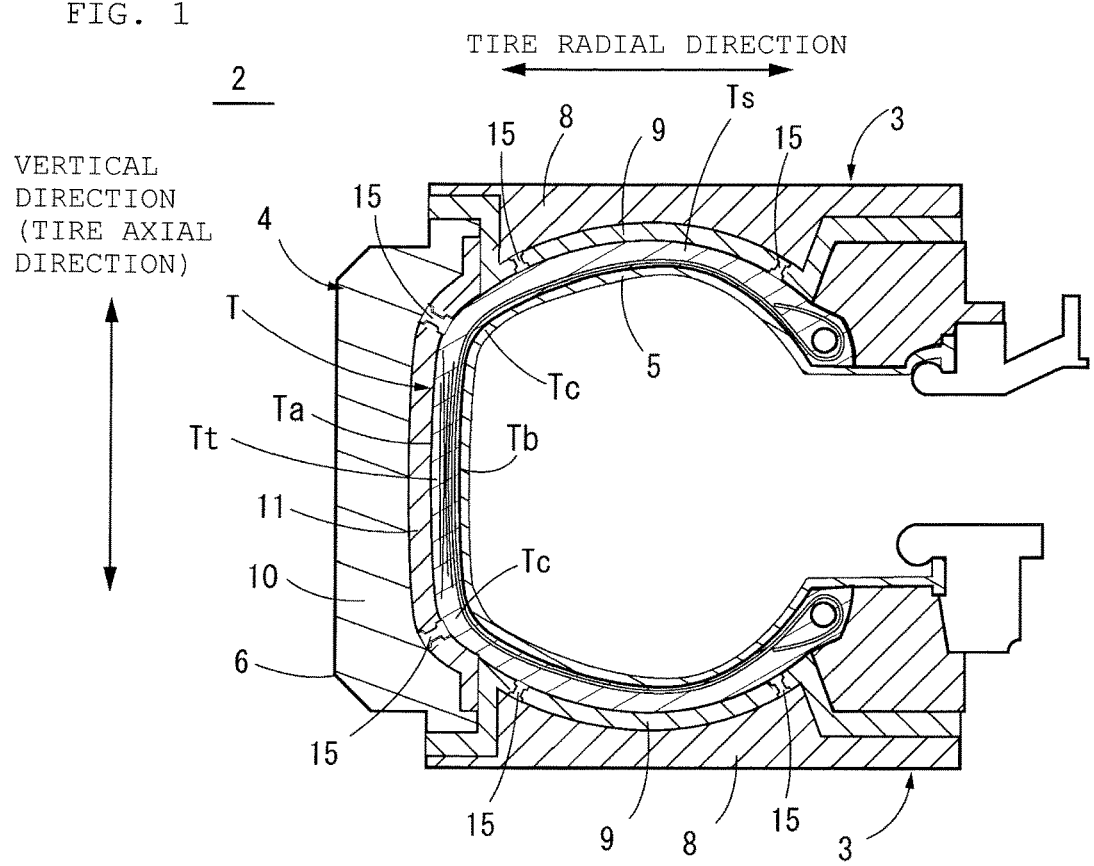
FIG. 1 is a sectional view showing a curing apparatus.

FIG. 1 is a half sectional view schematically showing an essential part of a curing apparatus 2. The mold according to the present embodiment is placed inside the curing apparatus 2 as shown in FIG. 1. The curing apparatus 2 includes a pair of side-molding sections 3, 3 for molding the side regions Ts of the outer surface of a tire T, a tread-molding section 4 for molding the tread region Tt, and a bladder 5 for molding the inner surface of the tire. The side-molding sections 3, 3, which are disposed in upper and lower opposite positions, are each formed approximately into a disk shape along the circumference of the side region Ts of the tire T. The tread-molding section 4, which is disposed between the upper and lower side-molding sections 3, 3, is comprised of a plurality of sector pieces 6 arranged annularly along the circumference of the tire T. The side-molding sections 3, 3 each include a base disk 8 and a side mold 9. The base disk 8 is an attachment for securing the side mold 9. The side mold 9 has a predetermined molding pattern for molding the surface of the side region Ts of an uncured tire T. The sector piece 6 includes a sector segment 10 and a tread mold 11. The sector segment 10 is an attachment for securing a plurality of divided pieces of the tread mold 11. The tread mold 11 has a molding pattern for performing a predetermined molding on the tread region Tt of an uncured tire T. Also, the side mold 9 and the tread mold 11 have air discharge means 15 for discharging air trapped between the molding surface 11a and the outer surface Ta of the tire T to the back-surface side 11b at the time of tire molding.

The side mold 9 is so designed as to be vertically movable together with the base disk 8, whereas the tread mold 11 is so designed as to be radially movable together with the sector segment 10. The molding space enclosing the whole area of an uncured tire T is formed by getting the side molds 9, 9 and the tread mold 11, consisting of a plurality of sector pieces 6, closer to each other. Following the placement of an uncured tire T within the molding space, the bladder 5 disposed inside the tire T is inflated. With the inflation of the bladder 5, the tire T is pushed from inside toward the side molds 9, 9 and the tread mold 11. At this time, the air trapped between the outer surface Ta of the tire T and the surfaces of the side molds 9, 9 and the tread mold 11 is discharged through the air discharge means 15 from the molding-surface side 11a to the back-surface side 11b of the side molds 9, 9 and the tread mold 11. And the molding patterns formed on the side molds 9, 9 and the tread mold 11 is transferred to the outer surface of the tire T. Then simultaneously with the transfer of the molding patterns, the tire T is cure-molded by heating the tire T at predetermined temperatures. It is to be noted that on completion of the cure-molding, mold opening takes place with the side molds 9, 9 and the tread mold 11 moved apart from each other, and the cured tire T is removed.

The side molds 9 and the tread mold 11 according to the present embodiment are manufactured by an additive fabrication process. In the additive fabrication process, the model data of the molds designed by the computer, or CAD, is converted into a plurality of partial shape data (hereinafter referred to as slice data) of layered slices equal in thickness. Based on the slice data, a laser beam is directed to the metal powder deposited into the thickness of the partial shape, and the sintered layer of the metal powder having been sintered by the laser irradiation is laminated in a sequential order into a three-dimensional mold.

Hereinbelow, a description is given of the side molds 9 and the tread mold 11 for molding the outer surface of the tire T. For the ease of explanation, the following description is based on an example of a tread mold 11 only.

Figure 2:
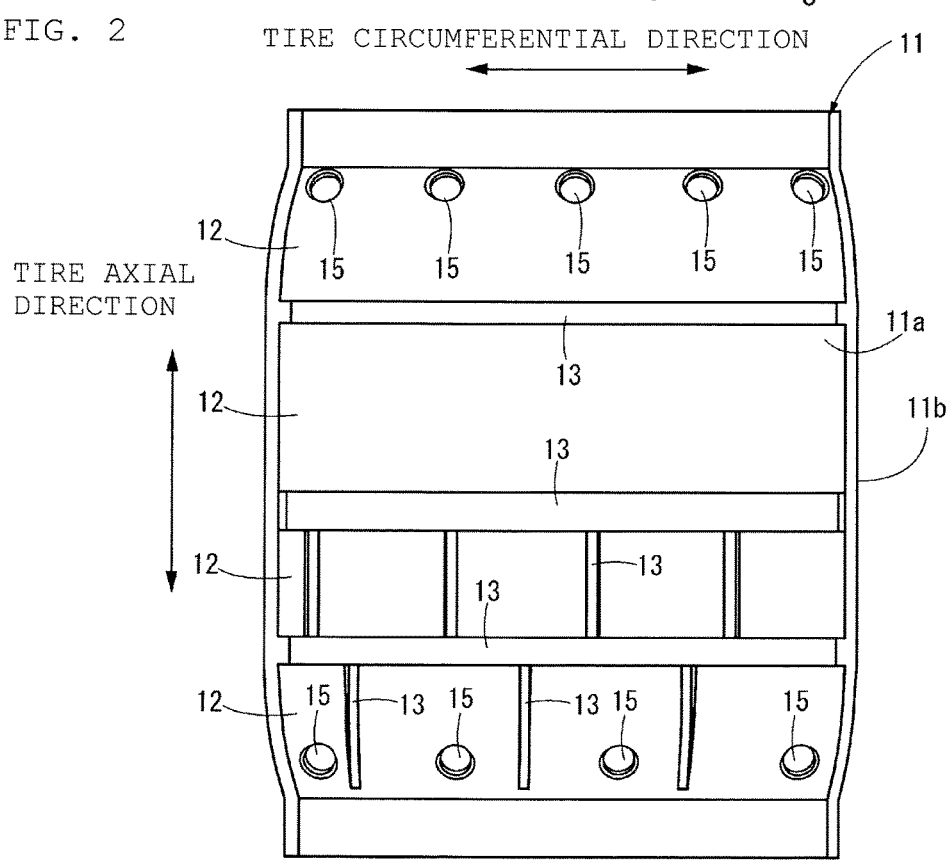
FIG. 2 shows a tread mold.

FIG. 2 is an illustration showing a tread mold 11. As shown in FIG. 2, the tread mold 11 has contact area molding sections 12 for molding the contact area of the outer surface Ta of the tire T and a plurality of groove parts 13 for molding the tread region Tt and a plurality of air discharge means 15 for discharging, at the time of curing, air trapped between the outer surface Ta of the tire T and the molding surface 11a of the tread mold 11. The contact area molding sections 12 form the base area of the molding surface 11a which forms the whole molding surface of the tread mold 11 with a predetermined curved surface. The groove parts 13 are disposed in such a manner as to extend in the circumferential and axial directions of the tire that project to predetermined heights from the contact area molding sections 12 of the molding surface 11a. Since the tread mold 11 is disposed in such a position as to mold the tread region Tt of the tire T held horizontally within the curing apparatus 2, a plurality of air discharge means 15 are provided along the tire circumference in positions corresponding to the shoulder region Tc of the tire T where air can be trapped during the curing process (see FIG. 1).

Figure 3:
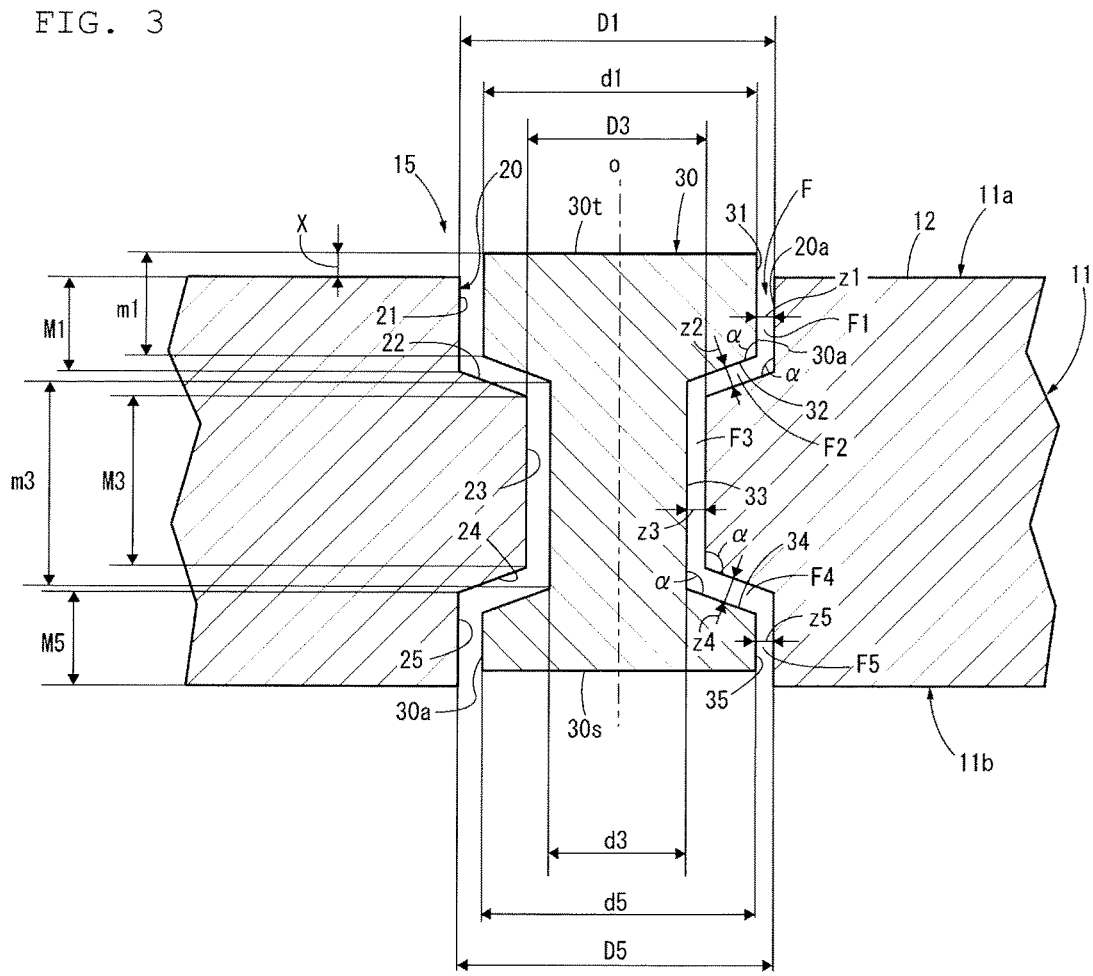
FIG. 3 is a sectional view of an air discharge means set in the design of a tread mold.

FIG. 3 is a sectional view of an air discharge means set in the design of a tread mold 11. Hereinbelow, a description is given of the air discharge means 15 with reference to FIG. 3. The air discharge means 15 has a hollow F communicating with the molding surface 11a side and the back surface 11b side of the tread mold 11, a hole 20 provided in the body of the tread mold 11, which serves as the outer member of the hollow F, and a core member 30 disposed inside the hole 20.

The hollow F is so set that the axis line o thereof falls into line with the line normal to the molding surface 11a, for instance. This hollow F is formed by setting an annular clearance of a predetermined dimension between the hole wall 20a of the hole 20 and the peripheral surface 30a of the core member 30. In the present embodiment, a description is given such that the annular clearance between the hole wall 20a of the hole 20 and the peripheral surface 30a of the core member 30 is formed circular in cross section. It is to be noted that the annular clearance meant herein is a shape in the cross section orthogonal to the extension direction of the hollow F. And the shape thereof is not limited to circular, but it may be elliptical or polygonal, such as triangular, square, and even star-shaped. That is, the hollow F is provided as an annular clearance formed between the hole wall 20a, circular in cross section, and the peripheral surface 30a, circular in cross section.

The hollow F has an inflow area F1 opening on the molding surface 11a, a discharge area F5 opening on the back surface 11b, and an intermediate area F3 communicating with the inflow area F1 and the discharge area F5 within the tread mold 11. The inflow area F1, the discharge area F5, and the intermediate area F3 are each circular in cross section and coaxial with each other. The intermediate area F3 is formed with the diameter thereof smaller than the diameter of the inflow area F1 and the diameter of the discharge area F5. Provided at the ends of the intermediate area F3 are a conically contracting area F2 communicating with the inflow area F1 and a conically expanding area F4 communicating with the discharge area F5. That is, the conically contracting area F2 is provided at the inflow area F1 side end of the intermediate area F3, and the conically expanding area F4 is provided at the discharge area F5 side end of the intermediate area F3.

It is to be noted that the diameters of the hollow F are the distances between the not-shown center lines of the clearance widths of the inflow area F1, the discharge area F5, and the intermediate area F3, for instance.

Hereinbelow, a description is given of a hole 20 and a core member 30 forming the respective areas F1 to F5 of the hollow F. The hole 20 is provided in the mold 11 as a through hole penetrating from the molding surface 11a to the back surface 11b, for instance. The hole 20 extends in the extension direction thereof with the diameter thereof varying from area to area. The hole 20 has a cylindrical surface 21 opening on the molding surface 11a, a conically contracting surface 22 connecting to the cylindrical surface 21, a cylindrical surface 23 connecting to the conically contracting surface 22, a conically expanding surface 24 connecting to the cylindrical surface 23, and a cylindrical surface 25 connecting to the conically expanding surface 24 and opening on the back surface 11b. And these surfaces 21 to 25 form a continuous hole wall 20a.

The cylindrical surface 21, annular in shape, extends for a predetermined length M1 along the axis line o of the hollow F, for instance. The length M1 is set at 0.5 mm or less, for instance. Also, the diameter D1 of the cylindrical surface 21 is set at a predetermined dimension.

The conically contracting surface 22 is formed, for instance, into a conical surface whose diameter decreases conically as it extends from the peripheral edge on the back surface 11b side of the cylindrical surface toward the back surface 11b. The conically contracting angle of the conically contracting surface 22 is set to a predetermined inclined angle α with respect to the cylindrical surface 21. Here the inclined angle α is the angle of intersection between the cylindrical surface 21 and the conically contracting surface 22 as viewed in cross section shown in FIG. 3.

The cylindrical surface 23 extends from the peripheral edge on the smaller diameter side of the conically contracting surface 22 toward the back surface 11b side. The cylindrical surface 23 extends for a predetermined length M3 at a fixed diameter D3. The diameter D3 of the cylindrical surface 23 is set smaller than the diameter D1 of the cylindrical surface 21 and the diameter D5 of the cylindrical surface 25 to be discussed later.

The conically expanding surface 24 is formed, for instance, into a conical surface whose diameter increases conically as it extends from the end of the cylindrical surface 23 toward the back surface 11b. The conically expanding surface 24 expands at the same angle as the inclined angle α of the conically contracting surface 22 as it contracts.

The cylindrical surface 25 extends along the axis line o of the hollow F from the peripheral edge on the larger diameter side of the conically expanding surface toward the back surface 11b side for a predetermined length M5 and opens on the back surface 11b. The diameter D5 of the cylindrical surface 25 is set at least larger than the diameter D3 of the cylindrical surface 23.

In this embodiment, the axis line of the cylindrical surface 21, the axis line of the conically contracting surface 22, the axis line of the cylindrical surface 23, the axis line of the conically expanding surface 24, and the axis line of the cylindrical surface 25 are set coaxially with each other.

The core member 30, which forms a hollow F by being disposed within the hole 20, is formed as an axial body whose outer shape approximately follows along the inner peripheral shape of the hole 20.

That is, the core member 30 has a cylindrical surface 31 along the cylindrical surface 21 of the hole 20, a conically contracting surface 32 along the conically contracting surface 22, a cylindrical surface 33 along the cylindrical surface 23, a conically expanding surface 34 along the conically expanding surface 24, and a cylindrical surface 35 along the cylindrical surface 25. And these surfaces 31 to 35 form a continuous peripheral surface 30a whose diameter increases and decreases.

The cylindrical surface 31, annular in shape, has the axis line thereof extending along the axis line o of the hollow F for a predetermined length ml, for instance. The length ml of the cylindrical surface 31 is set the same as the length M1 of the cylindrical surface 21, for instance. That is, the length ml of the cylindrical surface 31 is set at 0.5 mm or less, for instance. Also, the diameter dl of the cylindrical surface 31 is set smaller than the diameter D1 of the cylindrical surface 21 so as to form clearance dimension z1 between the cylindrical surface 31 and the cylindrical surface 21 of the hole 20. The position of the core member 30 at the time of designing is so set that the end surface 30t thereof on the cylindrical surface 31 side protrudes above the molding surface 11a by a predetermined protrusion height x. The protrusion height x is, more specifically, set according to the clearance dimension z2 between the conically contracting surface 22 of the hole 20 and the conically contracting surface 32 of the core member 30 to be discussed later. The end surface 30t is formed, for instance, into a flat surface or a curved surface curved along the contact area molding section 12 of the molding surface 11a in which the hole 20 is formed.

The conically contracting surface 32 is formed, for instance, into a conical surface whose diameter decreases conically as it extends from the peripheral edge on the back surface 11b side of the cylindrical surface 31 toward the back surface 11b. The conically contracting surface 32, located in opposition to the conically contracting surface 22 of the hole 20, extends in parallel with the conically contracting surface 22 of the hole 20 so as to form a clearance dimension z2 between itself and the conically contracting surface 22.

The cylindrical surface 33 extends from the peripheral edge on the smaller diameter side of the conically contracting surface 32 toward the back surface 11b side for a predetermined length at a fixed diameter d3. The diameter d3 of the cylindrical surface 33 is set smaller than the diameter dl of the cylindrical surface 31 and the diameter d5 of the cylindrical surface 35 to be discussed later. Also, the length m3 of the cylindrical surface 33 is set longer than the length M3 of the cylindrical surface 23 of the hole 20.

The conically expanding surface 34 is formed, for instance, into a conical surface whose diameter increases conically as it extends from the peripheral edge on the back surface 11b side of the cylindrical surface 33 toward the back surface 11b. The conically expanding surface 34, located in opposition to the conically expanding surface 24 of the hole 20, extends in parallel with the conically expanding surface 24 of the hole 20 so as to form a clearance dimension z4 between itself and the conically expanding surface 24.

The cylindrical surface 35 extends along the axis line o of the hollow F from the peripheral edge on the larger diameter side of the conically expanding surface 34 toward the back surface 11b side and opens on the back surface 11b. The diameter d5 of the cylindrical surface 35 is set at least larger than the diameter d3 of the cylindrical surface 33. The diameter d5 of the cylindrical surface 35 is so set as to form a clearance dimension z5 between itself and the cylindrical surface 25 of the hole 20.

It is to be noted that in this embodiment, the axis line of the cylindrical surface 31, the axis line of the conically contracting surface 32, the axis line of the cylindrical surface 33, the axis line of the conically expanding surface 34, and the axis line of the cylindrical surface 35 are set coaxially with each other. That is, the axis line of the core member 30 as a whole is coaxial with the axis line of the hole 20 as a whole.

Also, the shape of the conically contracting surfaces 22, 32 and the conically expanding surfaces 24, 34 is not limited to conical surfaces, but may be any shape, such as bowl-shape, whose diameter monotonically increases or decreases from one side to the other.

The above-described clearance dimensions z1 to z5 are set to larger than 0 mm and smaller than 0.5 mm, for instance. This will make the spews forming on account of the clearance F disappear altogether or intermittently. More preferably, if they are set smaller than 0.06 mm, then there will be little entry of rubber into the clearance F and only air will be discharged from there. If the clearance dimension of the clearances F of the annular hollow is set to smaller than 0.5 mm, the spews forming will be very thin and low in height. Then, without the removal of the spews after cure-molding, the condition similar to the spew mark worn off by about 100 km of vehicular running will be created provided that the vehicle fitted with the tires is operated normally on dry road surfaces. Hence, there will be no drop in the appearance quality as well as the motion performance and anti-wear performance of the tire, which results in generally excellent performance of the tire. It is to be noted that the initial travel of about 300 km with winter tires having low (soft) modulus of elasticity of the tread rubber is required before the spew marks after cutter removal of the spews formed by the air vent holes (circular cross section 1 to 2 mm in diameter), which are conventional air discharge means, are worn off completely. And it is the initial travel of about 500 to 1000 km with high-performance passenger tires having high (hard) modulus of elasticity of the tread rubber. Moreover, the spews formed by making the clearance dimension of the clearance F of the annular hollow smaller than 0.06 mm will be further reduced in height and disappear from the intermittent presence along the annular extension direction of the hollow on the tire surface. That is, by making the width of the air vent hole larger than 0 mm, in other words, by making the width of the air vent hole smaller than 0.06 mm without eliminating air vent holes, there will be little entry of rubber into the air vent hole and only air will be discharged from there.

It is to be noted that if the width of the air vent hole is 0 mm (presence of no air vent hole), the tire cannot be manufactured because the air or gas discharge performance becomes nil and consequently there result flaws, dents and air blisters on the tire surface. It is also to be noted that the above-described clearance dimensions z1 to z5 are dimensions in the normal direction from the inner wall of the hole 20 toward the axis line n. In the following description, the clearance dimensions z1 to z5 are treated as the same dimension, but they may be varied as appropriate as long as they are within the range described above. The hollow F consists of the inflow area F1 having the clearance dimension z1 between the cylindrical surface 21 and the cylindrical surface 31, the conically contracting area F2 having the clearance dimension z2 between the conically contracting surface 22 and the conically contracting surface 32, the intermediate area F3 having the clearance dimension z3 between the cylindrical surface 23 and the cylindrical surface 33, the conically expanding area F4 having the clearance dimension z4 between the conically expanding surface 24 and the conically expanding surface 34, and the discharge area F5 having the clearance dimension z5 between the cylindrical surface 25 and the cylindrical surface 35. This hollow F communicates with the molding space on the molding surface 11a side and the space on the back surface 11b and becomes an air discharge passage that allows the flow of air.

Figure 4A:
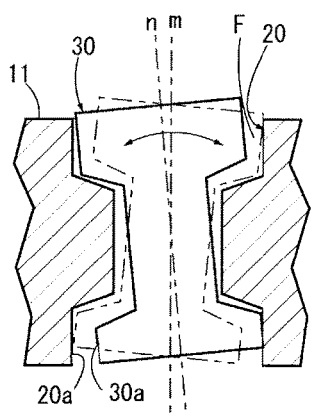
FIG. 4 shows the movement of a valve member.
Figure 4B:
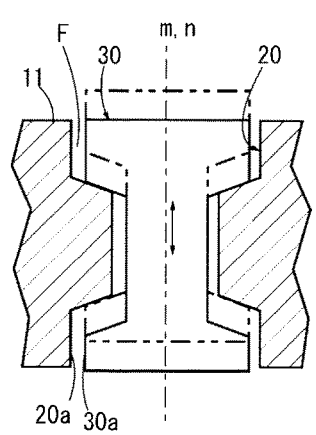
Figure 4C:
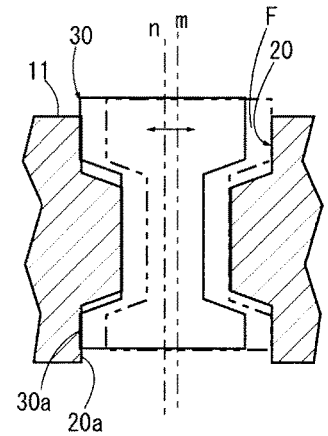

FIG. 4 shows the movement of an air discharge means 15. As described already, the hollow F is provided in the tread mold 11 as the air discharge means 15. Then, as shown in FIG. 4A, the core member 30 defining the hollow F swings inside the hole 20 such that the axis line n tilts in relation to the axis line m of the hole 20. Also, as shown in FIG. 4B, the core member 30 moves along the direction of the axis line m of the hole 20. And, as shown in FIG. 4C, the core member 30 moves in parallel with the axis line m of the hole 20. Also, as shown in FIG. 3, a clearance is set within the above-mentioned range of clearance dimensions between the hole 20 and the core member 30 to form the hollow F at the time of mold designing. Thus, the flow passage that allows the passage of air from the molding surface 11a side to the back surface 11b side can be secured. This hollow F functioning as the air discharge means 15 is formed as the hole 20 serving as the outer member of the hollow F and the core member 30 as the inner member within the hole 20 are molded in the process of manufacturing the mold by an additive fabrication process.

Figure 5:
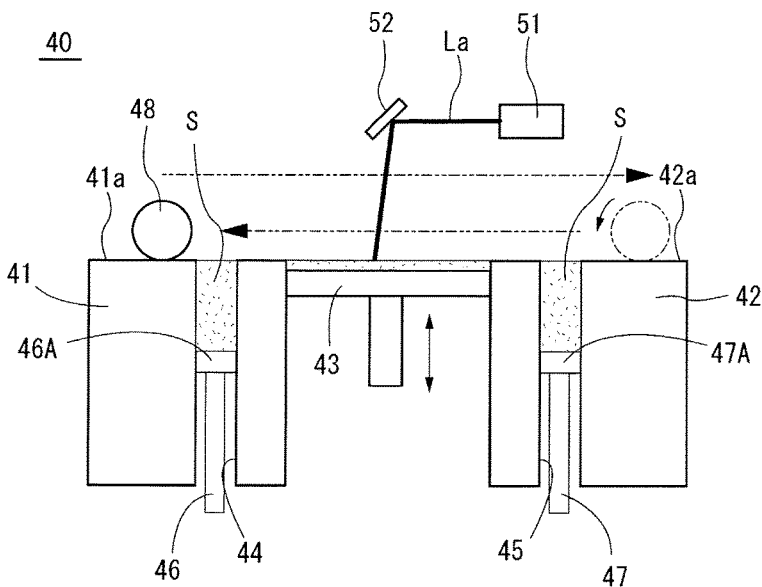
FIG. 5 shows an exemplary embodiment of an additive fabrication apparatus.

FIG. 5 shows an example of an additive fabrication apparatus 40. The additive fabrication apparatus 40 includes a pair of left and right stages 41, 42 disposed a predetermined distance apart from each other and a worktable 43 equipped vertically movably between the left and right stages 41, 42. The left and right stages 41, 42 are set to the same height so that the upper surfaces thereof are located in the same plane. The stages 41, 42 hold cylinder portions 44, 45 extending in the vertical direction, respectively. The cylinder portions 44, 45 open on the upper surface 41a, 42a sides of the stages 41, 42, respectively. Disposed inside the cylinder portions 44, 45 are feeders 46, 47 having pistons 46A, 47A slidable along the inner peripheral surfaces of the cylinder portions 44, 45, respectively. The feeders 46, 47 rise and fall along the axis lines of the cylinder portions 44, 45, respectively, by the operation of a not-shown drive mechanism driving according to the signals outputted from a not-shown additive fabrication apparatus control means. To be filled up to the upper surfaces of the stages 41, 42 on the pistons 46A, 47A is metal powder S to serve as the material for the manufacture of the mold.

Located on the upper surfaces 41a, 42a of the stages 41, 42 is a roller 48 that moves along the upper surfaces 41a, 42a. Driven by a not-shown drive unit, the roller 48 moves between the left and right stages 41, 42, with the peripheral surface thereof rolling in contact with the upper surfaces 41a, 42a of the left and right stages 41, 42. Located above the worktable 43 are a laser gun 51 for emitting a laser beam and an irradiation mirror 52 for directing the laser beam emitted by the laser gun 51 toward the metal powder S. The irradiation mirror 52 forms a sintered layer by sintering the metal powder S deposited on the upper surface of the worktable 43 according to the control signals outputted from the not-shown additive fabrication apparatus control means. The irradiation mirror 52 sinters the metal powder S deposited on the upper surface of the worktable 43 in a sequential order by moving along the coordinate axis set on the worktable 43 as the scanning direction, driven by a not-shown drive means based on the slice data outputted from the not-shown additive fabrication apparatus control means. Upon completion of formation of a sintered layer corresponding to one slice data, the sintering based on the slice data set above the one slice data is started. After this, sintered layers are laminated in correspondence with the respective slice data, and eventually a tread mold 11 is manufactured in the form as shown in FIG. 2.

Hereinbelow, a description is given of a method for manufacturing an air discharge means 15 by an additive fabrication apparatus 40. The hollow F constituting the air discharge means 15 according to the present embodiment is formed such that there is no connection between the hole 20 provided in the tread mold 11 as the external member of the hollow F and the core member 30 provided as the inner member inside the hole 20. Accordingly, a little ingenuity is required if the hollow F is to be formed with accuracy in its shape and position by an additive fabrication process.

When the tread mold 11 is manufactured using an additive fabrication apparatus 40 as shown in FIG. 5, the manufacture progresses upward by repeating the process of stacking a new sintered layer by depositing new metal powder on the sintered layer already formed with metal powder S deposited to a predetermined thickness and then sintered into a predetermined shape.

In the manufacture of an object like the hole 20 and the core member 30, which have no physical connection between the outer member and the inner member forming the hollow F, dislocation of the core member 30 may occur gradually in relation to the hole 20, which is the already sintered outer member, as pressures are applied to parts of the already sintered core member 30 by the operation of the roller 48 when new metal powder S is deposited on the sintered layer. As a result, it is not possible to manufacture a hollow F in a desired shape.

Figure 6A:
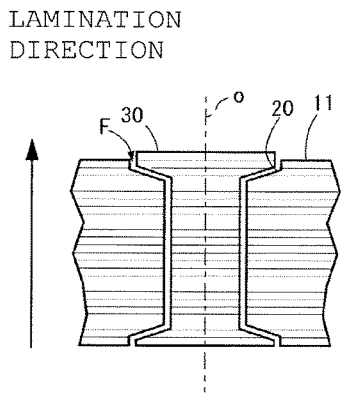
FIG. 6 shows the relationship between the lamination direction of manufacturing and the axis of the air discharge means.
Figure 6B:
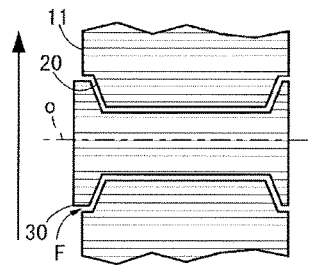
Figure 6C:
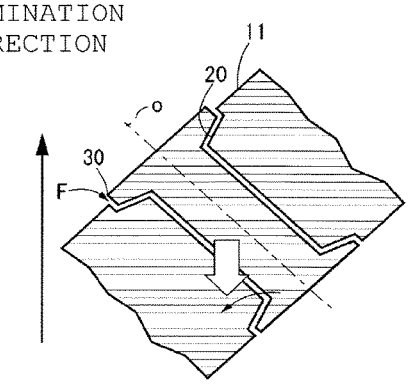

For example, as shown in FIGS. 6A and 6B, when the axis line o of the hollow F is in parallel with the lamination surface or when it is in parallel with the lamination direction, the effect of pressures from the roller 48 in forming the hollow F is small because the pressures on the hole 20 and core member 30 halfway through the manufacture is well balanced. However, as shown in FIG. 6C, when the axis line o of the hollow F is on a slant relative to the lamination direction, then the position of the core member 30 halfway through the manufacture may get dislocated gradually in relation to the hole 20 halfway through the manufacture such that the core member 30, for instance, rotates with respect to the hole 20 halfway through the manufacture. Thus the hollow F cannot be manufactured into the shape as designed. To form the hollow F into a desired shape, therefore, props 50 interlinking the hole 20 and the core member 30 may be placed on the lower layer side, more preferably at the lowest layer, of the hollow F at the time of designing the hollow F in the mold 11.

Figure 7:
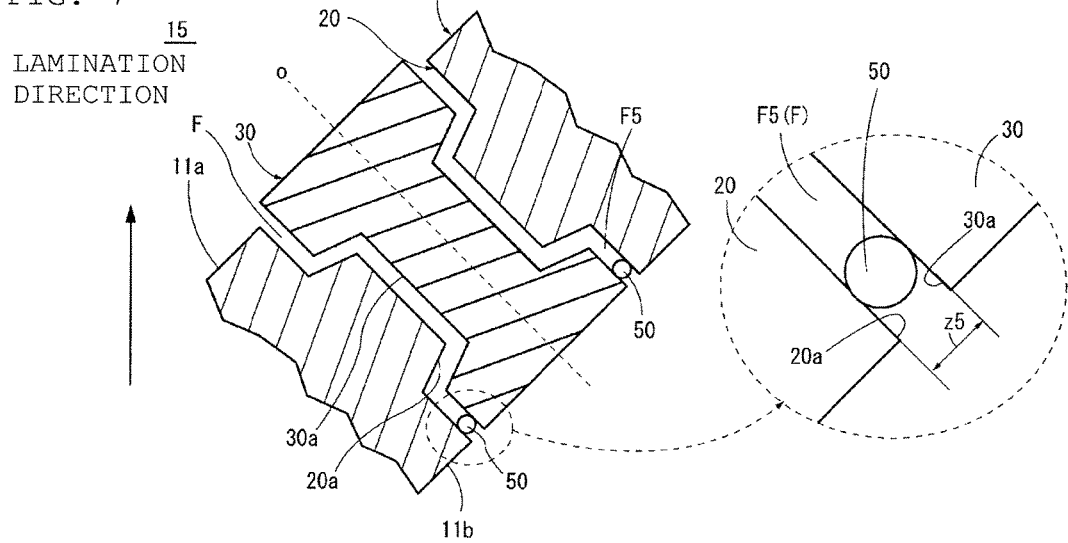
FIG. 7 is a sectional view illustrating a state in which props are set in an air discharge means of a tread mold designed by CAD.

FIG. 7 is a sectional view illustrating a state in which props 50 are set in an air discharge means 15 of a tread mold 11 designed by CAD. The props 50 are disposed as interlinking pieces interlinking the hole wall 20a of the hole 20 and the peripheral surface 30a of the core member 30 at the time of designing the mold by CAD. The props 50 are each spherical, for instance. It is desirable that the props 50 be located on the lamination start side of metal powder S in the additive fabrication apparatus 40 within the hollow F set at the designing. That is, the props 50 are to be set in positions where they can be molded integrally with the hole wall 20a of the hole 20 before the molding of the core member 30 is started. It is to be noted that molding integrally means that in the molding with the additive fabrication apparatus 40, the hole wall 20a of the hole 20 and the props 50 are sintered in connection with each other within the same layer of deposited metal powder S. With the positions of the props 50 set like this, the hollow F of a desired shape can be formed in the tread mold 11 by being supported by the hole wall 20a via the props 50 in the molding by the additive fabrication apparatus 40 of the core member.

Thus, with the spherical props 50 placed in positions of the hollow F, an air discharge means 15 which functions reliably as the air discharge passage can be created inside the mold 11 in the additive fabrication of the mold by the additive fabrication apparatus 40 without bothering with the lamination direction.

It is to be noted that, as mentioned above, the props 50 should be placed in the discharge area F5 as close to the back surface 11b side as practicable. This will avoid the eventual treatment of the tread mold 11 as defective when faulty removal of any of the props 50 has caused damage to part of the hole 20 or the core member 30. In this manner, by a simple technique, the props 50 can be molded together with the tread mold 11, and furthermore the core member 30 can be molded in linkage with the props 50. Therefore, the props 50 can be easily removed by giving a slight shock to the core member 30 with a punch or the like after the molding of the tread mold 11. Thus, there will be almost no difference in man-hours required in mold manufacture even when the props 50 are placed in the discharge area F5.

Figure 8A:
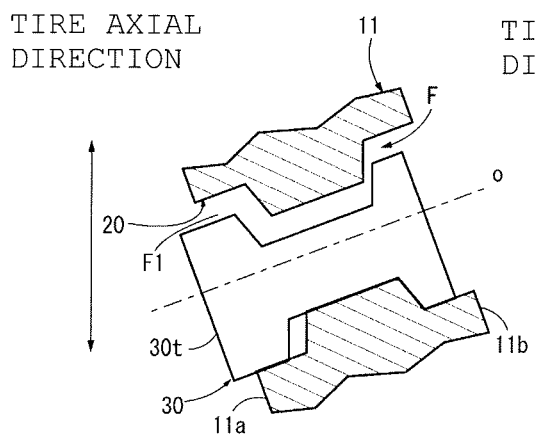
FIG. 8 shows the initial state of a valve member before curing.
Figure 8B:
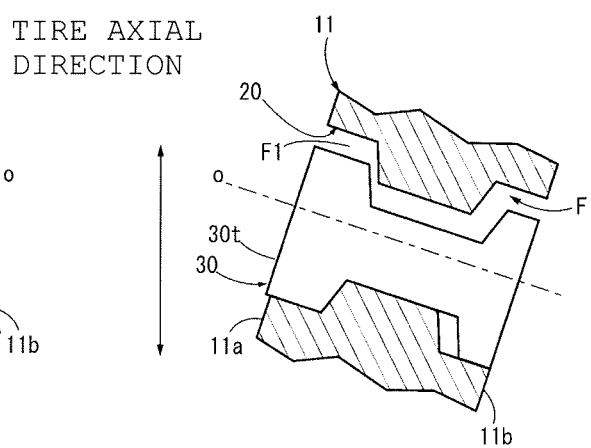

FIGS. 8A and 8B are illustrations showing the hollow F with the props 50 removed. As already mentioned, the hollow F is placed in the axially outer area of the tread mold 11. Hence, the axis line o of the hollow F is at a slant, and as shown in FIGS. 8A and 8B, the core member 30 forming the hollow F inside the hole 20 is dislocated downward as much as the clearance of the hollow F. More specifically, when the inflow area F1 is facing downward as shown in FIG. 8A, the core member 30 moves downward in the hole 20, thus moving toward the molding surface 11a. Thus, the conically expanding surface 24 of the hole 20 and the conically expanding surface 34 of the core member 30 are in contact with each other. As a result, the hollow F designed to have an annular cross section maintains the air discharge passage with the shape of the clearance turning crescentic in cross section. Also, the conically expanding surface 24 of the hole 20 and the conically expanding surface 34 of the core member 30 being in contact with each other creates a fall-out prevention part which prevents the core member 30 from falling out of the hole 20 from the molding surface 11a side. Also, when the discharge area F5 is facing downward as shown in FIG. 8B, the core member 30 moves downward in the hole 20, thus moving toward the back surface 11b. Thus, the conically contracting surface 22 of the hole 20 and the conically contracting surface 32 of the core member 30 are in contact with each other. As a result, the hollow F designed to have an annular cross section maintains the air discharge passage with the shape of the clearance turning crescentic in cross section. Also, the conically contracting surface 22 of the hole 20 and the conically contracting surface 32 of the core member 30 being in contact with each other creates a fall-out prevention part which prevents the core member 30 from falling out of the hole 20 from the back surface 11a side.

FIG. 9 shows the movement of an air discharge means 15 in the state as shown in FIG. 8B during cure-molding of the tire. Hereinbelow, a description is given of the movement of the air discharge means 15 with reference to the illustrations.

Figure 9A:
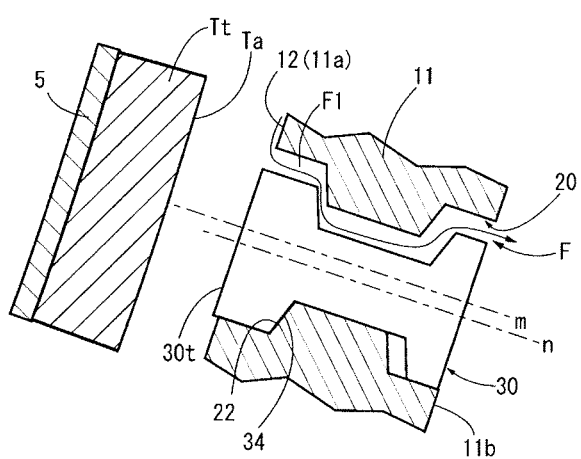
FIG. 9 shows the movement of an air discharge means during cure-molding of a tire.

Immediately after the start of curing, as shown in FIG. 9A, there exists air between the outer surface Ta of the uncured tire T and the contact area molding section 12 of the molding surface 11a of the tread mold 11. With the bladder 5 disposed on the inner surface Tb side of the tire T being inflated from this state, the tire T is pressed toward the molding surface 11a of tread mold 11. And the air that has initially existed between the outer surface Ta of the tire T and the molding surface 11a is gradually discharged to the back surface 11b side, passing through the hollow F.

Figure 9B:
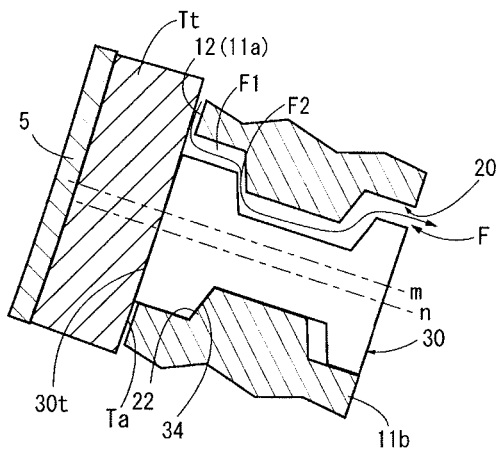
Figure 9C:
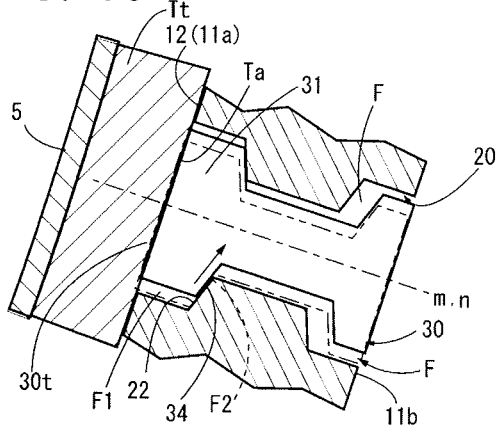

As shown in FIG. 9B, as the inflation of the bladder 5 progresses, most of the air is discharged from between the outer surface Ta of the tire T and the molding surface 11a. Then the outer surface Ta of the tire T comes in contact with the end surface 30t of the core member 30. And, as shown in FIG. 9C, as the pressure of the bladder 5 pushes the tire T further against the molding surface 11a, the core member 30 is pushed into the hole 20 toward the back surface 11b side. And the core member 30 moves along the conically contracting surface 22 of the hole 20 with part of the conically contracting surface 32 of the core member 30 in contact with the conically contracting surface 22 such that the axis line n of the core member 30 becomes coaxial with the axis line m of the hole 20. And when the conically contracting surface 22 of the hole 20 and the conically contracting surface 32 of the core member 30 come in face-to face contact with each other, the conically contracting area F2 of the hollow F disappears, and the passage of air through the hollow F from the molding surface 11a side to the back surface 11b side is shut off. At the same time, the end surface 30t on the molding surface 11a side in the inflow area F1 becomes flush with the molding surface 11a, which makes the surface of the tire after molding smooth.

Figure 9D:
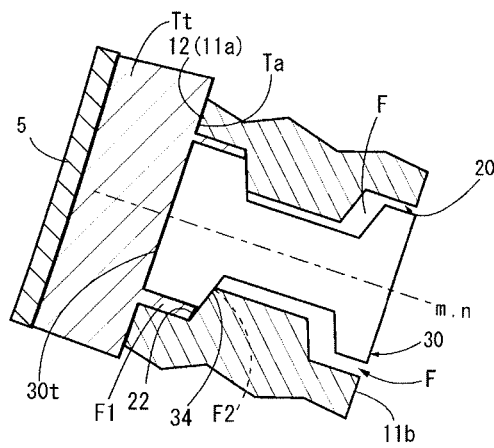

As shown in FIG. 9D, with the pressure of the bladder 5 continuing, the tire T is pushed against the tread mold 11. Consequently, rubber enters in the annular inflow area F1 between the cylindrical surface 31 of the core member 30 and the cylindrical surface 21 of the hole 20. However, since the conically contracting area F2 of the hollow F is closed with the rubber continuously pressing the end surface 30t of the core member 30, the rubber no longer advances deeper than the inflow area F1. And the state of non-entry of rubber deeper than the inflow area F1 is maintained until the cure-molding comes to an end.

In this manner, the tire T pushes the core member 30 toward the back surface 11b after the intended discharge of air. And the conically contracting area F2 of the hollow F is closed up with the conically contracting surface 32 of the core member 30 pressed against the conically contracting surface 22 of the hole wall 20a. As a result, the height of a spew formed on the outer surface Ta of the tire T during the molding of the tire can be set to the height of the inflow area F1. Therefore, setting the height of the inflow area F1 to about 0.5 mm, for instance, as already mentioned will save the need for subsequent spew removal process and disposal of spews.

FIG. 10 is a cross-sectional view of another embodiment of an air discharge means 15 to be set at designing of the tread mold 11. The air discharge means 15 according to this embodiment, as with the foregoing embodiment, is so set that the axis line o thereof falls into line with the line normal to the molding surface 11a and that the intermediate area F3 of the hollow F is larger in diameter than the inflow area F1 and the discharge area F5.

The hollow F has an inflow area F1 opening on the molding surface 11a, a discharge area F5 opening on the back surface 11b, and an intermediate area F3 communicating with the inflow area F1 and the discharge area F5 within the tread mold 11. The inflow area F1, the discharge area F5, and the intermediate area F3 are each formed circular in cross section and are set coaxially with the axis o. The intermediate area F3 is formed larger in diameter than the inflow area F1 and the discharge area F5.

Provided at the respective ends of the intermediate area F3 are the conically contracting area F2 communicating with the inflow area F1 and the conically expanding area F4 communicating with the discharge area F5.

It is to be noted that the diameters of the hollow F are set between the center lines of the clearance widths at the inflow area F1, the discharge area F5, and the intermediate area F3, for instance.

Hereinbelow, a description is given of the hole 20 and the core member 30 forming the areas F1 to F5 of the hollow F. The holes 20 are provided in the tread mold 11 as through holes penetrating from the molding surface 11a to the back surface 11b, for instance. The hole 20 extends in the extension direction thereof with the diameter thereof varying from area to area. The hole 20 has a cylindrical surface 21 opening on the molding surface 11a, a conically expanding surface 24 continuing from the cylindrical surface 21, a cylindrical surface 23 continuing from the conically expanding surface 24, a conically contracting surface 22 continuing from the cylindrical surface 23, and a cylindrical surface 25 continuing from the conically contracting surface 22 and opening on the back surface 11b. These surfaces 21 to 25 form a single continuous hole wall 20a.

The cylindrical surface 21, annular in cross section, extends with the axis line thereof running along the axis line o of the hollow F for a predetermined length M1, for instance. The length M1 is set at 0.5 mm or less, for instance. Also, the diameter D1 of the cylindrical surface 21 is set to a predetermined dimension.

The conically expanding surface 24 is formed as a conical surface whose diameter increases conically from the peripheral edge of the cylindrical surface 21 on the back surface 11b side toward the back surface 11b. A predetermined inclined angle α is set as the angle of diameter expansion of the conically expanding surface 24 with respect to the cylindrical surface 21.

The cylindrical surface 23 extends for a predetermined length M3 at a fixed diameter from the peripheral edge of the conically contracting surface 22 toward the back surface 11b side. The diameter D3 of the cylindrical surface 23 is set smaller than the diameter D1 of the cylindrical surface 21 and the diameter D5 of the cylindrical surface 25 to be discussed later.

The conically contracting surface 22 extends as it contracts conically, for instance, from the end of the cylindrical surface 23 toward the back surface 11b. The conically contracting surface 22 expands its diameter at the angle of the conically contracting surface 22 as it contracts its diameter.

The cylindrical surface 25 extends along the axis line o of the hollow F for a predetermined length M5 from the peripheral edge of the conically contracting surface 22 on the smaller diameter side toward the back surface 11b side and opens on the back surface 11b. The diameter D5 of the cylindrical surface 25 is set at least smaller than the diameter D3 of the cylindrical surface 23.

In this embodiment, the axis line of the cylindrical surface 21, the axis line of the conically expanding surface 24, the axis line of the cylindrical surface 23, the axis line of the conically contracting surface 22, and the axis line of the cylindrical surface 25 are set coaxially with each other.

The core member 30, which forms a hollow F by being disposed within the hole 20, is formed as an axial body whose outer shape approximately follows along the inner peripheral shape of the hole 20.

That is, the core member 30 has a cylindrical surface 31 along the cylindrical surface 21 of the hole 20, a conically expanding surface 34 along the conically expanding surface 24 thereof, a cylindrical surface 33 along the cylindrical surface 23 thereof, a conically contracting surface 32 along the conically contracting surface 22 thereof, and a cylindrical surface 35 along the cylindrical surface 25 thereof. And these surfaces 31 to 35 form a continuous peripheral surface 30a whose diameter increases and decreases.

The cylindrical surface 31, annular in shape, has the axis line thereof extending along the axis line o of the hollow F for a predetermined length ml, for instance. The length ml of the cylindrical surface 31 is set the same as the length M1 of the cylindrical surface 21, for instance. That is, the length ml of the cylindrical surface 31 is set at 0.5 mm or less, for instance. Also, the diameter dl of the cylindrical surface 31 is set larger than the diameter D1 of the cylindrical surface 21 so as to form a clearance dimension z1 between the cylindrical surface 31 and the cylindrical surface 21 of the hole 20. The position of the core member 30 at the time of designing is so set that the end surface 30t thereof on the cylindrical surface 31 side protrudes above the molding surface 11a by a predetermined protrusion height x. The protrusion height x is, more specifically, is set as a function of the clearance dimension z4 between the conically expanding surface 24 of the hole 20 and the conically expanding surface 34 of the core member 30 to be discussed later. The end surface 30t is formed, for instance, into a flat surface or a curved surface curved along the contact area molding section 12 of the molding surface 11a in which the hole 20 is formed.

The conically expanding surface 34 is formed, for instance, into a conical surface whose diameter increases conically as it extends from the peripheral edge of the cylindrical surface 31 on the back surface 11b side toward the back surface 11b. The conically expanding surface 34, located in opposition to the conically expanding surface 24 of the hole 20, extends in parallel with the conically expanding surface 24 of the hole 20 so as to form a clearance dimension z4 between itself and the conically expanding surface 24.

The cylindrical surface 33 extends from the peripheral edge of the conically expanding surface 34 on the larger diameter side toward the back surface 11b side for a predetermined length at a fixed diameter d3. The diameter d3 of the cylindrical surface 33 is set larger than the diameter dl of the cylindrical surface 31 and the diameter d5 of the cylindrical surface 35 to be discussed later. Also, the length m3 of the cylindrical surface 33 is set shorter than the length M3 of the cylindrical surface 23 of the hole 20.

The conically contracting surface 32 is formed, for instance, into a conical surface whose diameter decreases conically as it extends from the peripheral edge of the cylindrical surface 33 on the back surface 11b side toward the back surface 11b. The conically contracting surface 32, located in opposition to the conically contracting surface 22 of the hole 20, extends in parallel with the conically contracting surface 22 of the hole 20 so as to form a clearance dimension z2 between itself and the conically contracting surface 22.

The cylindrical surface 35 extends along the axis line o of the hollow F from the peripheral edge of the conically contracting surface 34 on the smaller diameter side toward the back surface 11b side and opens on the back surface 11b. The diameter D5 of the cylindrical surface 35 is set at least smaller than the diameter D3 of the cylindrical surface 33. The diameter D5 of the cylindrical surface 35 is so set as to form a clearance dimension z5 between itself and the cylindrical surface 25 of the hole 20.

It is to be noted that in this embodiment, the axis line of the cylindrical surface 31, the axis line of the conically expanding surface 34, the axis line of the cylindrical surface 33, the axis line of the conically contracting surface 32, and the axis line of the cylindrical surface 35 are set coaxially with each other. That is, the axis line of the core member 30 as a whole is coaxial with the axis line of the hole 20 as a whole.

Accordingly, the hollow F is comprised of an inflow area F1 having an annular clearance between the cylindrical surface 21 and the cylindrical surface 31, a conically expanding area F4 having an annular clearance between the conically expanding surface 24 and the conically expanding surface 34, an intermediate area F3 having an annular clearance between the cylindrical surface 23 and the cylindrical surface 33, a conically contracting area F2 having an annular clearance between the conically contracting surface 22 and the conically contracting surface 32, and a discharge area F5 having an annular clearance between the cylindrical surface 25 and the cylindrical surface 35. This hollow F communicates with the molding space on the molding surface 11a side and the space on the back surface 11b and serves as an air discharge passage that allows the flow of air. The clearance dimension z1 of the inflow area F1, the clearance dimension z2 of the conically contracting area F2, the clearance dimension z3 of the intermediate area F3, the clearance dimension z4 of the conically expanding area F4, and the clearance dimension z5 of the discharge area F5, the respective areas forming the hollow F, are set within the range of 0.05 mm to 0.1 mm, for instance. It is to be noted here that the clearance dimensions z1 to z5 are the dimensions in the normal direction from the inner wall of the hole 20 toward the axis line o. The following description is based on the assumption that the clearance dimensions z1 to z5 of the respective areas F1 to F5 from the inflow area F1 to the discharge area F5 are all of the same dimension, although they may be changed as appropriate within the above-cited range.

As described already, an annular clearance of a predetermined dimension is provided between the hole wall 20a of the hole 20 and the peripheral surface 30a of the core member 30 to form the hollow F as the air discharge means 15. As a result, as shown in FIG. 11A, the core member 30 swings within the clearance of the hollow F such that the axis line n tilts in relation to the axis line m of the hole 20. Also, as shown in FIG. 11B, the core member 30 moves along the axis line m of the hole 20. And, as shown in FIG. 11C, the core member 30 moves in parallel with the axis line m of the hole 20.

Figure 12A:
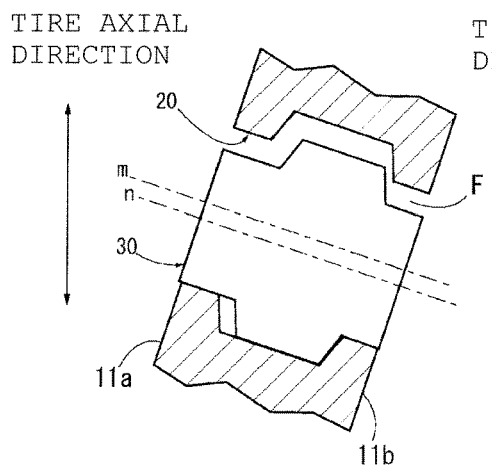
FIG. 12 shows the initial state of a valve member before curing (another embodiment).
Figure 12B:
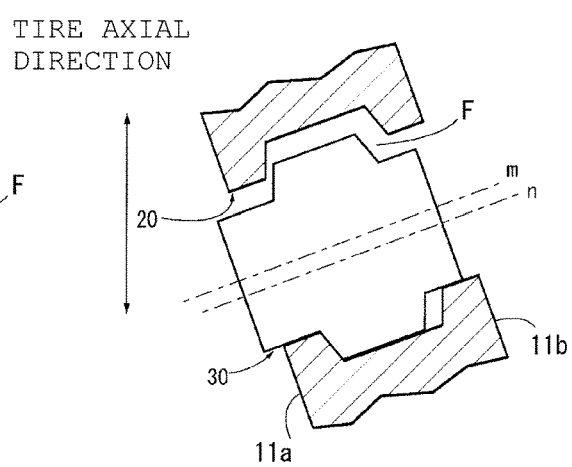

FIGS. 12A and 12B are illustrations showing the movement of the air discharge means 15. As already mentioned, the hollows F are placed in the axially outer areas of the tread mold 11. Hence, the axis line o of the hollow F is at a slant, and as shown in FIGS. 12A and 12B, the core member 30 forming the hollow F inside the hole 20 is dislocated downward as much as the clearance of the hollow F.

More specifically, when the discharge area F5 is facing downward as shown in FIG. 12A, the core member 30 moves downward in the hole 20 as much as the clearance of the hollow F. At the same time, the core member 30 moves toward the back surface 11b, and the conically contracting surface 22 of the hole 20 and the conically contracting surface 32 of the core member 30 come in contact with each other. As a result, the hollow F designed to have an annular cross section maintains the air discharge passage with the shape of the clearance turning crescentic in cross section from a perfect annular shape. Also, the conically contracting surface 22 of the hole 20 and the conically contracting surface 32 of the core member 30 being in contact with each other creates a fall-out prevention part which prevents the core member 30 from falling out of the hole 20 from the back surface 11b side. Also, when the inflow area F1 is facing downward as shown in FIG. 12B, the core member 30 moves downward in the hole 20 as much as the clearance of the hollow F. At the same time, the core member 30 moves toward the molding surface 11a side, and the conically expanding surface 24 of the hole 20 and the conically expanding surface 34 of the core member 30 come in contact with each other. As a result, the hollow F designed to have an annular cross section maintains the air discharge passage with the shape of the clearance turning crescentic in cross section from a perfect annular shape. Also, the conically expanding surface 24 of the hole 20 and the conically expanding surface 32 of the core member 30 being in contact with each other creates a fall-out prevention part which prevents the core member 30 from falling out of the hole 20 from the molding surface 11a side.

FIG. 13 shows the movement of an air discharge means 15 in the state as shown in FIG. 12A during curing of the tire. Hereinbelow, a description is given of the movement of the air discharge means 15 with reference to the illustrations. Immediately after the start of curing, as shown in FIG. 13A, there exists air between the outer surface Ta of the uncured tire T and the contact area molding section 12 of the molding surface 11a of the tread mold 11. With the bladder 5 disposed on the inner surface Tb side of the tire T being inflated from this state, the tire T is pressed toward the molding surface 11a of tread mold 11. And the air that has initially existed between the outer surface Ta of the tire T and the molding surface 11a is gradually discharged to the back surface 11b side through the hollow F of the air discharge means 15.

Figure 13A:
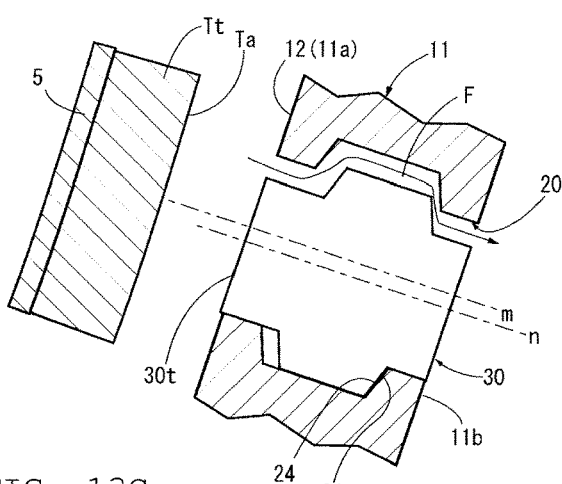
FIG. 13 shows the movement of an air discharge means during cure-molding of a tire (another embodiment).
Figure 13B:
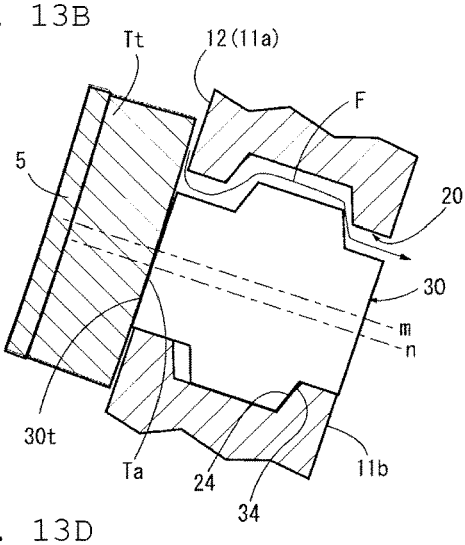
Figure 13C:
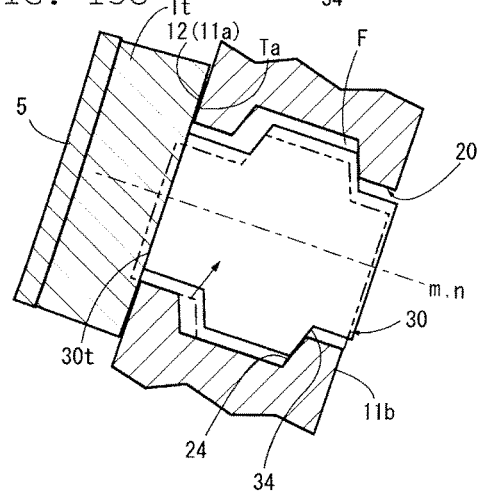

As shown in FIG. 13B, as the inflation of the bladder 5 progresses, most of the air is discharged from between the outer surface Ta of the tire T and the molding surface 11a. Then the outer surface Ta of the tire T comes in contact with the end surface 30t of the core member 30. And, as shown in FIG. 13C, as the pressure of the bladder 5 pushes the tire T further against the molding surface 11a, the core member 30 is pushed into the hole 20 such that the axis line n of the core member 30 becomes coaxial with the axis line m of the hole 20. That is, since the conically contracting surface 32 of the core member 30 and the conically contracting surface 22 of the hole 20 are conically shaped, the core member 30 moves along the conically contracting surface 22 of the hole 20 as the tire T pushes the end surface 30t of the core member 30 in the direction of the axis line m of the hole 20. Then the conically contracting surface 22 of the hole 20 and the conically contracting surface 32 of the core member 30 come in contact with each other, thereby closing the conically contracting area F2 of the hollow F. This will block the flow of air from the molding surface 11a side to the back surface 11b side.

Figure 13D:
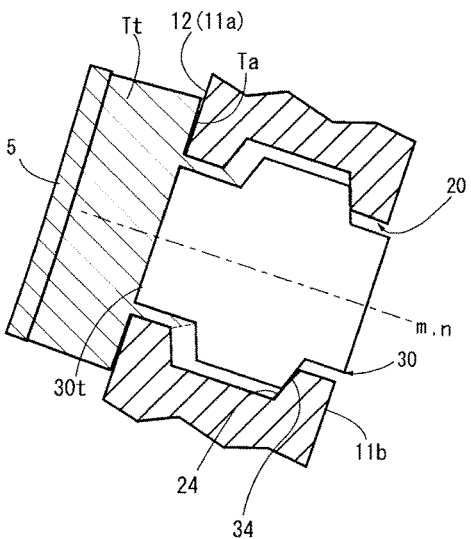

As shown in FIG. 13D, with the pressure of the bladder 5 continuing, the tire T is pushed against the tread mold 11. At this time, there exist forces to lead the rubber on the tire surface into the hollow F from the inflow area F1 side thereof. However, since the conically contracting area F2 of the hollow F is closed with the rubber pressing the end surface 30t of the core member 30, the air remaining in the conically expanding area F4 and the intermediate area F3 prevents the intrusion of rubber having entered the inflow area F1 deeper than the inflow area F1. And during a predetermined time until the cure-molding comes to an end, the state of non-entry of rubber deeper than the inflow area F1 is maintained.

In this manner, the tire T pushes the core member 30 toward the back surface 11b after the intended discharge of air. And the conically contracting area F2 of the hollow F is closed up with the conically contracting surface 32 of the core member 30 pressed against the conically contracting surface 22 of the hole wall 20a. As a result, the height of a spew formed on the outer surface Ta of the tire T during the molding of the tire can be set to the height of the inflow area F1, for instance, about 0.5 mm. This will save the need for subsequent spew removal process and disposal of spews, as is necessary with the conventional tires after cure-molding.

Also, the height of the inflow area F1 formed by the cylindrical surface 21 of the hole 20 the cylindrical surface 31 of the core member 30 may be adjusted. Then it is possible to improve the appearance of the tire T by controlling the length of spews formed on the outer surface Ta of the cure-molded tire T. This will render unnecessary the process for cutting off spews and eliminate the man-hours required for the disposal of spews from the total man-hours taken in the production of the tire T. Also, the absence of left-over rubber after the removal of spews improves the initial performance of the tire.

The foregoing embodiment has been explained on the assumption that the axis line of the inflow area F1, the axis line of the conically expanding area F4, the axis line of the intermediate area F3, the axis line of the conically contracting area F2, and the axis line of the discharge area F5 are set coaxially with each other. However, the arrangement may be such that at least one of the inflow area F1, the intermediate area F3, and the discharge area F5 has a bent portion that changes the extension direction of the hollow F. In such a case, too, the peripheral surface 30a of the core member 30 may be formed to follow along the hole wall 20a of the hole 20 forming the hollow F, and also the end surface 30t of the core member 30 may be so formed as to protrude above the molding surface 11a. This will suppress the formation of rubber spews.

Figure 14:
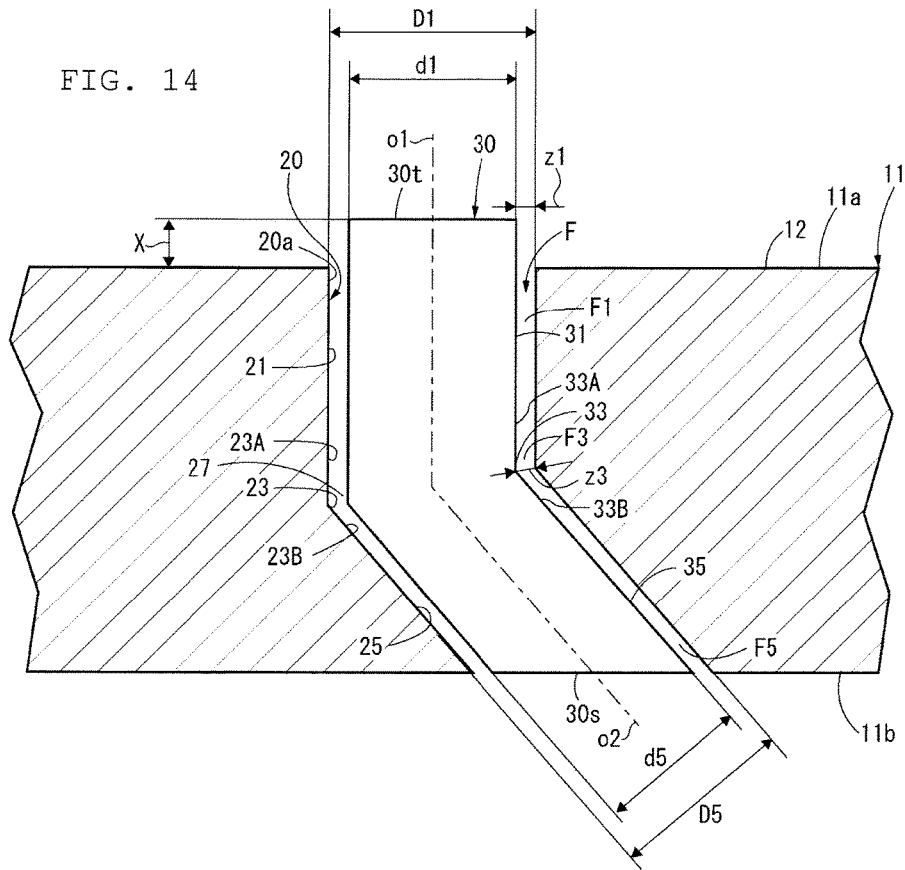
FIG. 14 shows the states of movement of a valve member (another embodiment).

FIG. 14 is a cross-sectional view of another embodiment of an air discharge means 15 to be set at designing of the tread mold 11. The air discharge means 15 is constructed to have a bent portion of the hollow F as shown in FIG. 14, for instance. The hollow F in this embodiment has a bent portion bending at a predetermined angle in the intermediate area F3 midway between the molding surface 11a and the back surface 11b. That is, the hollow F is formed such that the axis line o1 of the inflow area F1 opening on the molding surface 11a and the axis line o2 of the discharge area F5 opening on the back surface 11b intersect with each other in the intermediate area F3.

The hole 20 forming the hollow F according to this embodiment is formed with a cylindrical surface 21 opening on the molding surface 11a, a cylindrical surface 25 opening on the back surface 11b, and a bent cylindrical surface 23 connecting with the cylindrical surface 21 and the cylindrical surface 25. The cylindrical surface 21 is formed such that it extends for a predetermined length in the normal direction of the molding surface 11a and terminates within the range of the thickness of the mold, for instance. The bent cylindrical surface 23 is formed such that it continues from the cylindrical surface 21 and is bent to change the direction of the axis line of the cylindrical surface 21. That is, the bent cylindrical surface 23 has a molding surface side portion 23A extending coaxially with the axis line of the cylindrical surface 21 and a back surface side portion 23B extending coaxially with the axis line of the cylindrical surface 25. The back surface side portion 23B of the bent cylindrical surface 23 is formed such that it continues from the molding surface side portion 23A in a manner intersecting therewith and terminates within the range of the thickness of the tread mold 11. The cylindrical surface 25 continues from the back surface side portion 23B of the bent cylindrical surface 23 and opens on the back surface 11b.

The core member 30 is formed into an axial shape circular in cross section having the external shape following along the inner peripheral shape of the hole 20. The core member 30 forming the hollow F has, on its periphery, a cylindrical surface 31 along the cylindrical surface 21, a bent cylindrical surface 33 along the bent cylindrical surface 23, and a cylindrical surface 35 along the cylindrical surface 25. The cylindrical surface 31 extends for a predetermined length along the axis line of the cylindrical surface 21 toward the back surface 11b side. The cylindrical surface 31 is set smaller in diameter than the cylindrical surface 21 of the hole 20 so as to form an annular clearance of predetermined dimension between itself and the cylindrical surface 21. The height of the cylindrical surface 31 is set greater than the height of the cylindrical surface 21, for instance. The position of the core member 30 at the time of designing is so set that the end surface 30t thereof on the cylindrical surface 31 side protrudes above the molding surface 11a by a predetermined protrusion height x. The protrusion height x is set as a function of the clearance dimension of the hollow F. The end surface 30t protruding above the molding surface 11a is formed, for instance, into a flat surface or a curved surface curved along the contact area molding section 12 of the molding surface 11a in which the hole 20 is formed.

The bent cylindrical surface 33 extends for a predetermined length along the extension direction of the bent cylindrical surface 23 of the hole 20 toward the back surface 11b side. The bent cylindrical surface 33 is comprised of a molding surface side portion 33A forming a predetermined annular clearance located opposite to the molding surface side portion 23A of the bent cylindrical surface 23 of the hole 20 and a back surface side portion 33B forming a predetermined annular clearance located opposite to the back surface side portion 23B of the bent cylindrical surface 23 of the hole 20. The cylindrical surface 35 extends along the extension direction of the cylindrical surface 25 toward the back surface 11b side. The cylindrical surface 35, located opposite to the cylindrical surface 25 of the hole 20, is so set so as to form a predetermined annular clearance between itself and the cylindrical surface 25. The core member 30 has a single continuous peripheral surface 30a consisting of the cylindrical surface 31, the bent cylindrical surface 33, and the cylindrical surface 35.

Therefore, the hollow F is comprised of an inflow area F1 having an annular clearance between the cylindrical surface 21 and the cylindrical surface 31, an intermediate area F3 having an annular clearance between the bent cylindrical surface 23 and the bent cylindrical surface 33, and a discharge area F5 having an annular clearance between the cylindrical surface 25 and the cylindrical surface 35. The clearance dimension z1 of the inflow area F1, the clearance dimension z3 of the intermediate area F3, and the clearance dimension z5 of the discharge area F5, the respective areas forming the hollow F, are set within the range of 0.05 mm to 0.1 mm, for instance. This hollow F communicates with the molding space on the molding surface 11a side and the space on the back surface 11b and serves as an air discharge passage that allows the flow of air.

The bending angle of the hollow F is set in consideration of the clearance dimensions set as described above such that the core member 30 does not fall out of the hole 20. That is, the core member 30 has an angle so set as to prevent the core member 30 from falling out of the hole 20, with the peripheral surface 30a in contact with the hole wall 20a of the hole 20.

It is to be noted here that the clearance dimensions z1, z3, and z5 are the dimensions in the normal direction from the inner wall 20a of the hole 20 toward the axis line n. The following description is based on the assumption that the clearance dimensions z1, z3, and z5 of the inflow area F1, the intermediate area F3, and the discharge area F5 are all of the same dimension, although they may be changed as appropriate within the above-cited range.

Figure 15A:
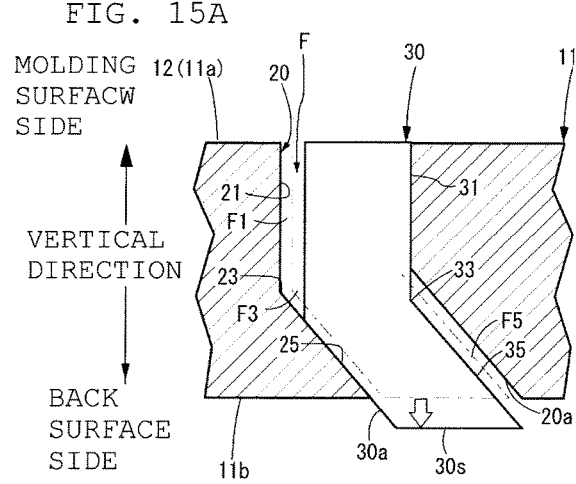
FIG. 15 shows another embodiment of an air discharge means.
Figure 15B:
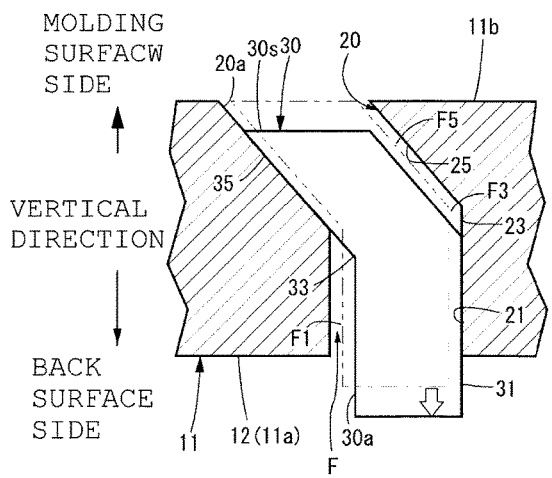

FIGS. 15A and 15B are illustrations showing the movement of the air discharge means 15 according to this embodiment. As shown in FIG. 15A, when the back surface 11b is facing downward, the core member 30 forming the hollow F moves as if it drops toward the back surface 11b side as much as the clearance between the back surface side portion of the intermediate area F3 provided as the air discharge passage and the discharge area F5. Also, as shown in FIG. 15B, the core member 30 forming the hollow F moves as if it drops toward the back surface 11b side as much as the clearance between the molding surface side portion of the intermediate area F3 provided as the air discharge passage and the inflow area F1.

Hereinbelow, a description is given of the movement of the air discharge means 15 in this embodiment.

Figure 16A:
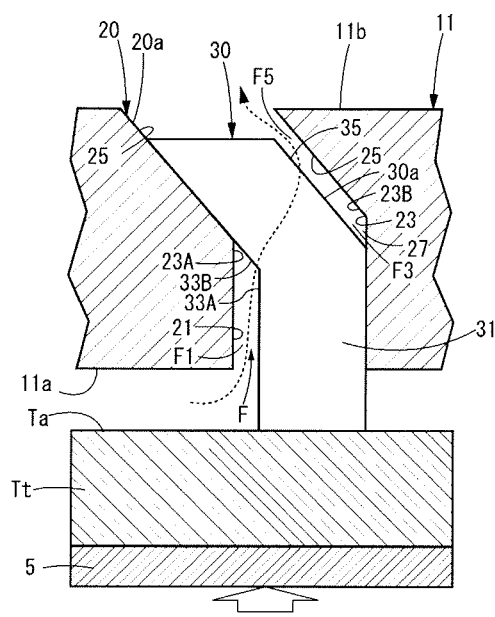
FIG. 16 shows the movement of an air discharge means during cure-molding of a tire (another embodiment).

FIG. 15 shows the movement of an air discharge means 15 in the state as shown in FIG. 15B during curing of the tire. Hereinbelow, a description is given of the movement of the air discharge means 15 with reference to the illustrations. Immediately after the start of curing, as shown in FIG. 16A, there exists air between the outer surface Ta of the uncured tire T placed in the molding space and the contact area molding section 12 of the molding surface 11a of the tread mold 11. With the bladder 5 disposed on the inner surface Tb side of the tire T being inflated from this state, the tire T is pressed toward the molding surface 11a of tread mold 11. And the air that has initially existed between the outer surface Ta of the tire T and the molding surface 11a is gradually discharged to the back surface 11b side through the hollow F.

Figure 16B:
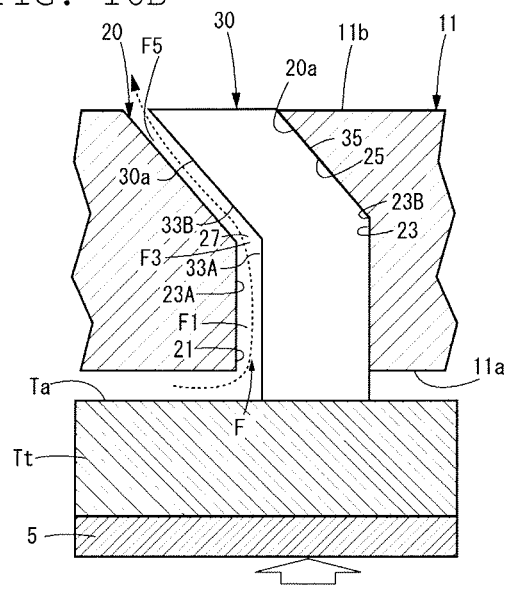
Figure 16C:
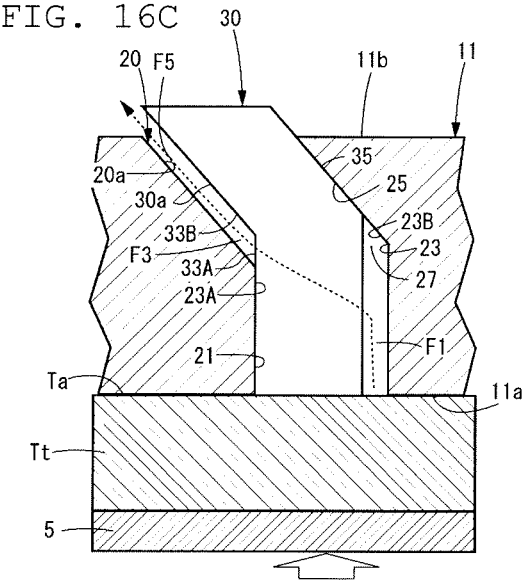

As shown in FIG. 16B, as the inflation of the bladder 5 progresses, air keeps being discharged from between the outer surface Ta of the tire T and the molding surface 11a. At the same time, the outer surface Ta of the tire T comes in contact with and pushes the end surface 30t of the core member 30, which causes the core member 30 to be pushed toward the back surface 11b side of the hole 20. And, as shown in FIG. 16C, as the pressure of the bladder 5 pushes the tire T further against the molding surface 11a, the core member 30 is pushed into the hole 20, maintaining the state of the core member 30 pressed against the hole wall 20a of the hole 20. As the peripheral surface 30a of the core member 30 comes in contact with the hole wall 20a of the hole 20, the movement of the core member 30 stops. At this time, the hollow F forms a flow passage changing the shape of the clearance from a crescent shape closed on the upper side to a crescent shape closed on the lower side, thus allowing the discharge of air from the molding surface 11a to the back surface 11b.

Further, with the pressure of the bladder 5 continuing, the tire T is pushed against the tread mold 11. At this time, there exist forces to lead the rubber on the surface of the tire T into the inflow area F1 of the hollow F. However, the inflow area F1 is annularly closed at the above-mentioned clearance dimension z1 by the molding surface 11a, and the intrusion of rubber deeper into the hole 20 toward the back surface 11b side is suppressed. Thus progresses the curing with the rubber restrained at a shallow position until the cure-molding comes to an end after a predetermined time.

In this manner, the tire T pushes the core member 30 toward the back surface 11b after the intended discharge of air. As a result, the formation of spews on the outer surface Ta of the tire T during the molding of the tire can be suppressed.

It is to be noted that although the present embodiment has been explained on the assumption that the bent porting 27 is provided in the intermediate area F3, the bent porting 27 may be provided in the inflow area F1 or the discharge area F5. That is, the arrangement may also be such as shown in FIG. 17 as still another embodiment of the air discharge means 15.

Figure 17:
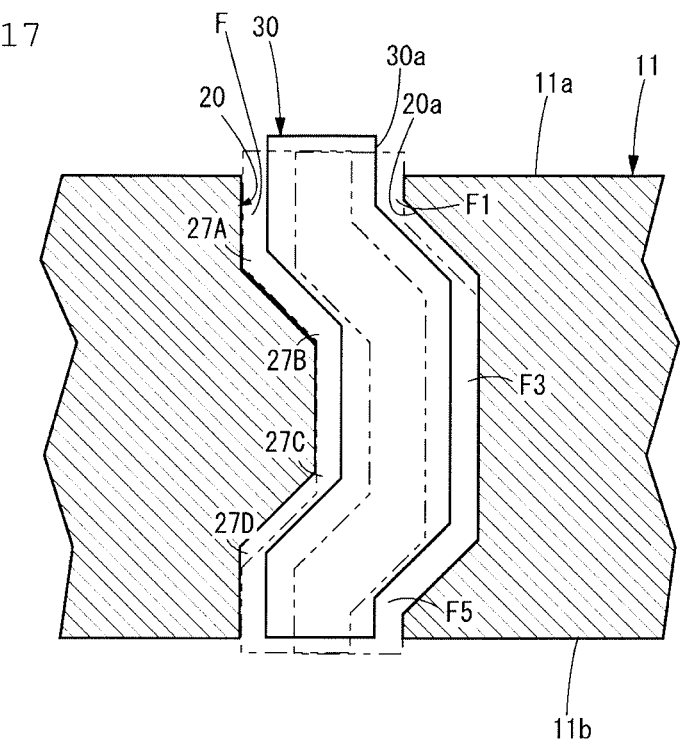
FIG. 17 shows another embodiment of an air discharge means.

The hollow F shown in FIG. 17 is so configured that the inflow area F1 has one bent portion 27A, the intermediate area F3 has two bent portions 27B, 27C, and the discharge area F5 has one bent portion 27D. In this manner, bent portions 27A to 27D may be provided in the annularly extending inflow area F1, the annularly extending intermediate area F3, and the annularly extending discharge area F5. As a result, the peripheral surface 30a of the core member 30 coming in contact with the hole wall 20a of the hole 20 at the bent portions 27A to 27D acts as a fall-out prevention part that prevents the core member 30 from falling out of the hole 20. This way the falling-out of the core member 30 from the hole 20 is prevented, and at the same time the hollow F for discharging air from the molding surface 11a side to the back surface 11b side can be secured.

In a configuration like this, the fall-out of the core member 30 forming the hollow F from the hole 20 may be prevented by providing bends or curves to the hole 20 and the core member 30 in such a manner that there are simultaneous contacts between the peripheral surface 30a of the core member 30 and the hole wall 20a of the hole 20 on the inflow area F1 side and between the peripheral surface 30a of the core member 30 and the hole wall 20a of the hole 20 on the discharge area F5 side.

Figure 18:
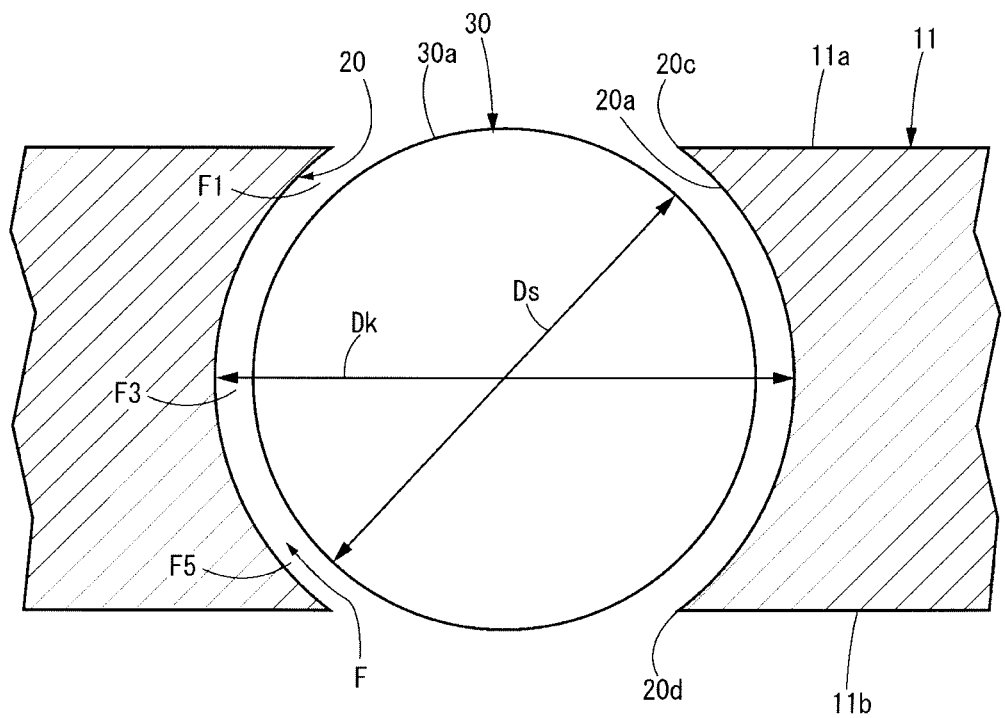
FIG. 18 shows another embodiment of an air discharge means.

Also, another embodiment of the hollow F may be a spherical one as shown in FIG. 18. In the hollow F shown in FIG. 18, a spherical core member 30 having a diameter smaller than the diameter Dk of the hole wall 20a is provided within the hole 20 formed spherically in the mold body of the tread mold 11, which is the outer member thereof. In this case, the falling-out of the core member 30 from the hole 20 may be prevented by setting the diameter Ds of the core member 30 larger than the diameter of opening rims 20c, 20d opening on the molding surface 11a and the back surface 11b, respectively. In this configuration, when the molding surface 11a or the back surface 11b is facing downward, the core member 30 can stop up the opening. To avoid this, projections projecting from the hole wall 20a may be provided near the opening rims 20c, 20d of the hole wall 20a, and thus an air discharge passage communicating with the molding surface 11a and the back surface 11b can be secured.

In the foregoing embodiments, descriptions have been given on the assumption that the cross-sectional shape of the hollow F, namely, the inflow area F1, the intermediate area F3, and the discharge area F5, orthogonal to the extension direction of the hollow F, or the axis line direction of the areas F1, F3, F5 are circular. However, the cross-sectional shape of the inflow area F1, the intermediate area F3, and the discharge area F5 may vary from each other.

As already described, according to the present invention, the discharge means 15 is molded integrally with the mold by an additive fabrication process. This makes the subsequent process performed conventionally unnecessary. It is believed that a total of about 1,000 air discharge means 15 is required by the upper and lower side molds 9, 9 and a plurality of tread molds 11 for molding a tire T. If these air discharge means 15 are to be formed using a conventional drill, the time to be taken to drill a single hole may be about 30 to 50 seconds, which means that this invention shortens the manufacturing time by a total of 500 to 830 minutes.

It is to be noted that in the foregoing embodiments, descriptions have been given of molds for cure-molding tires. However, the molds are not limited to those in tire manufacturing, but may be molds to be used in the molding of other rubber articles, such as rubber crawlers and rubber vibration isolators.

Also, in the foregoing embodiments, descriptions have been given of formation of a mold as a three-dimensional object by sintering metal powder with a laser beam directed thereto. However, it is possible to direct an LED beam from a semiconductor of a semiconductor laser in the place of an ordinary laser beam as described above. Thus, an energy source, including any light beam for sintering metal powder, may be selected according to the properties of the metal powder to be sintered.

Also, the material for constituting the mold is not limited to the metal powder as described so far, but may be resin powder, such as synthetic resin, ceramics or ceramic powder, which is an inorganic sintered material, or a composite material powder, which is a mixture of resin powder, ceramic powder, and metallic powder.

One arrangement of a rubber article mold according to the invention is a rubber article mold having air discharge portions for discharging air from a molding-surface side for molding a rubber article to a back-surface side. Each air discharge portion includes an annular hollow so formed as to penetrate from a molding surface to a back surface of the rubber article mold. And the annular hollow has an inflow area for allowing the inflow of air from the molding-surface side, a discharge area for discharging air on the back-surface side, and an intermediate area communicating with the inflow area and the discharge area and smaller or larger in diameter than the inflow area and the discharge area. Therefore, the air on the molding-surface side can be discharged reliably to the back-surface side. Also, the hollow, annular in shape, prevents the intrusion of the rubber on the rubber article surface into the hollow. As a result, the appearance of the rubber article surface after cure-molding can be improved, and the man-hours for spew cutting can be reduced.

Also, another arrangement of a rubber article mold according to the invention is a rubber article mold having air discharge portions for discharging air from a molding-surface side for molding a rubber article to a back-surface side thereof. Each air discharge portion includes an annular hollow penetrating from a molding surface to a back surface of the rubber article mold. And the annular hollow has an inflow area for allowing the inflow of air from the molding-surface side, a discharge area for discharging air to the back-surface side, and an intermediate area communicating with the inflow area and the discharge area. And at least one of the inflow area, the intermediate area, and the discharge area has a bent portion which changes an extension direction of the annular hollow. Therefore, the air on the molding-surface side can be discharged reliably to the back-surface side. Also, the hollow, annular in shape, prevents the intrusion of the rubber on the rubber article surface into the hollow. As a result, the appearance of the rubber article surface after cure-molding can be improved, and the man-hours for spew cutting can be reduced.

Also, still another arrangement of a rubber article mold according to the invention is a rubber article mold having air discharge portions for discharging air from a molding-surface side for molding a rubber article to a back-surface side. Each air discharge portion includes an annular hollow penetrating from a molding surface to a back surface of the rubber article mold. And a fall-out prevention portion is provided between an outer member and an inner member of the annular hollow to prevent the inner member from falling out of the outer member. Therefore, the air on the molding-surface side can be discharged reliably to the back-surface side. Also, the hollow, annular in shape, prevents the intrusion of the rubber on the rubber article surface into the hollow. As a result, the appearance of the rubber article surface after cure-molding can be improved, and the man-hours for spew cutting can be reduced.

Also, yet another arrangement of a rubber article mold according to the invention is a rubber article mold which has an annular hollow having an annular conically contracting area at an end of the inflow-area side of the intermediate area whose diameter reduces to a diameter of the intermediate area. And when the annular conically contracting area disappears, an end surface on the molding-surface side of the inflow-area becomes flush with the molding surface. This makes the rubber article surface after molding smooth.

Also, still another arrangement of a rubber article mold according to the invention is a rubber article mold in which a clearance dimension of the annular hollow is larger than 0 mm and smaller than 0.5 mm. As a result, the formation of spews can be suppressed reliably, and the process for spew cutting can be made unnecessary. That is, it is no longer necessary to cut spews because the spews to be formed by the air vent holes either disappear completely or intermittently. Moreover, by making the clearance dimension of the air vent hole even smaller than 0.06 mm, there will be little entry of rubber into the air vent hole, and thus air only can be discharged therethrough. Accordingly, when a tire, which is one of the rubber articles under consideration, is molded, the appearance and motion performance of the tire can be improved markedly.

Also, yet another arrangement of a rubber article mold according to the invention is a rubber article mold for which an outer member and an inner member of the annular hollow are formed by an additive fabrication process. As a result, the air discharge portions, such as annular hollows, featuring a construction which could not be manufactured by the other manufacturing methods can be formed, and at the same time the time for manufacturing the mold can be shortened.

Also, an embodiment of a method for manufacturing a rubber article mold according to the invention is a method for manufacturing a rubber article mold as recited in any of the above 1 to 6 by an additive fabrication process. The method includes casting a laser beam at metal powder and laminating sintered layers. In the method, interlinking pieces interlinking the inner member and the outer member by coming in contact with the inner member and the outer member forming the annular hollow are molded simultaneously on a lower layer side in a lamination direction of the sintered layers within the clearance of the annular hollow continuing from the molding-surface side to the back-surface side. Hence, the inner member inside the outer member can be molded accurately and reliably by preventing the inner member from moving relative to the outer member during the molding of the hollow by the additive fabrication process, resulting in the formation of a desired hollow.

Also, another method for manufacturing a rubber article mold according to the invention is a method in which the interlinking pieces are each spherical. As a result, the interlinking pieces can be removed easily from the outer member and the inner member.

Also, still another method for manufacturing a rubber article mold according to the invention is a method in which the inner member in the inflow area of the annular hollow protrudes above the molding surface. Hence, the protrusion of the inner member above the molding surface of the outer member makes it easy to remove the interlinking pieces by tapping the inner member.

DESCRIPTION OF REFERENCE NUMERALS

9 side mold
11 tread mold
11a molding surface
11b back surface
12 contact area molding section
15 air discharge means
20 hole
30 core member
F hollow
F1 inflow area
F2 conically contracting area
F3 intermediate area
F4 conically expanding area
F5 discharge area
T tire

The invention claimed is:
1. A rubber article mold having air discharge means for discharging air from a molding-surface side for molding a rubber article to a back-surface side, the air discharge means comprising:
an outer member with a molding surface and a back surface on an opposite side of the molding surface;
an inner member, wherein an annular hole is formed between the outer member and the inner member and formed so as to penetrate from the molding surface to the back surface, the hole including:
an inflow area for allowing an inflow of air from the molding-surface side,
a discharge area for discharging the air on the back-surface side, and
an intermediate area communicating with the inflow area and the discharge area and smaller or larger in diameter than the inflow area and the discharge area; and
interlinking pieces located in the discharge area of the hole and that contact an inner surface of the outer member and an outer surface of the inner member, wherein:
the interlinking pieces are sintered to the outer member and the inner member, and the outer member and the inner member are formed by an additive fabrication process.

2. A rubber article mold having air discharge means for discharging air from a molding-surface side for molding a rubber article to a back-surface side, the air discharge means comprising:
an outer member with a molding surface and a back surface on an opposite side of the molding surface;
an inner member, wherein an annular hole is formed between the outer member and the inner member and formed so as to penetrate from the molding surface to the back surface, the hole including:
an inflow area for allowing an inflow of air from the molding-surface side,
a discharge area for discharging the air to the back-surface side, and
an intermediate area communicating with the inflow area and the discharge area,
wherein at least one of the inflow area, the intermediate area, and the discharge area has a bent portion which changes an extension direction of the hole; and
interlinking pieces located in the discharge area of the hole and that contact an inner surface of the outer member and an outer surface of the inner member, wherein:
the interlinking pieces are sintered to the outer member and the inner member, and
the outer member and the inner member are formed by an additive fabrication process.

3. A rubber article mold having air discharge means for discharging air from a molding-surface side for molding a rubber article to a back-surface side, the air discharge means comprising:
an outer member with a molding surface and a back surface on an opposite side of the molding surface;
an inner member, wherein an annular hole is formed between the outer member and the inner member and formed so as to penetrate from the molding surface to the back surface, the hole including:
an inflow area for allowing an inflow of air from the molding-surface side,
a discharge area for discharging the air to the back-surface side, and
an intermediate area communicating with the inflow area and the discharge area; and
interlinking pieces located in the discharge area of the hole and that contact an inner surface of the outer member and an outer surface of the inner member, wherein:
a fall-out prevention portion is provided between the outer member and the inner member to prevent the inner member from falling out of the outer member,
the interlinking pieces are sintered to the outer member and the inner member, and
the outer member and the inner member are formed by an additive fabrication process.

4. The rubber article mold according to claim 1, wherein the hole further includes an annular conically contracting area between the inflow area and the intermediate area, the annular conically contracting area having a diameter that is reduced from the inflow area to the intermediate area.

5. The rubber article mold according to claim 1, wherein a clearance dimension hole is larger than 0 mm and smaller than 0.5 mm.

6. A method for manufacturing the rubber article mold as recited in claim 1 by the additive fabrication process, comprising:
casting a laser beam at metal powder and laminating sintered layers,
wherein the interlinking pieces interlinking the inner member and the outer member by coming in contact with the inner member and the outer member are molded simultaneously on a lower layer side in a lamination direction of the sintered layers within the hole continuing from the molding-surface side to the back-surface side.

7. The method for manufacturing a rubber article mold according to claim 6, wherein the interlinking pieces are each spherical.

8. The method for manufacturing a rubber article mold according to claim 6, wherein the inner member in the inflow area protrudes above the molding surface.

* * * * *